(12) United States Patent
Tatsui et al.

(10) Patent No.: US 9,640,820 B2
(45) Date of Patent: May 2, 2017

(54) POWER GENERATION SYSTEM AND METHOD OF OPERATING THE SAME

(75) Inventors: Hiroshi Tatsui, Shiga (JP); Junji Morita, Kyoto (JP); Shigeki Yasuda, Osaka (JP); Akinori Yukimasa, Osaka (JP); Atsutaka Inoue, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 397 days.

(21) Appl. No.: 13/821,280

(22) PCT Filed: Dec. 9, 2011

(86) PCT No.: PCT/JP2011/006901
§ 371 (c)(1),
(2), (4) Date: Mar. 7, 2013

(87) PCT Pub. No.: WO2012/081214
PCT Pub. Date: Jun. 21, 2012

(65) Prior Publication Data
US 2013/0177825 A1    Jul. 11, 2013

(30) Foreign Application Priority Data

Dec. 13, 2010 (JP) .................................. 2010-276953

(51) Int. Cl.
*H01M 8/06* (2016.01)
*H01M 8/0612* (2016.01)
(Continued)

(52) U.S. Cl.
CPC ........... *H01M 8/0618* (2013.01); *F23J 11/02* (2013.01); *F23N 3/082* (2013.01);
(Continued)

(58) Field of Classification Search
CPC ........... H01M 8/04067; H01M 8/0618; H01M 8/04761; H01M 2250/10; H01M 8/0612;
(Continued)

(56) References Cited

U.S. PATENT DOCUMENTS

2005/0118474 A1    6/2005  Ettwein et al.
2008/0075991 A1*   3/2008  LaVen ............... H01M 8/04231
                                                        429/408
(Continued)

FOREIGN PATENT DOCUMENTS

DE        10000405 A1    7/2000
EP         1039244 A2    9/2000
(Continued)

OTHER PUBLICATIONS

International Search Report mailed Feb. 14, 2012 issued in corresponding International Application No. PCT/JP2011/006901.
(Continued)

*Primary Examiner* — Jonathan Jelsma
*Assistant Examiner* — Omar Kekia
(74) *Attorney, Agent, or Firm* — McDermott Will & Emery LLP

(57) ABSTRACT

A power generation system of the present invention includes: a fuel cell unit (101) including a fuel cell (11) and a case (12); a controller (102); a combustion unit (103) provided outside the case (12) and configured to combust a combustible gas to supply heat; and a discharge passage (70) configured to cause the fuel cell unit (101) and the combustion unit (103) to communicate with each other, wherein in a case where an exhaust gas is being discharged to the discharge passage (70) from one of the fuel cell unit (101) and the combustion unit (103) and the controller (102) changes the flow rate of the exhaust gas discharged from the other unit, the controller (102) controls at least the flow rate (Continued)

of the exhaust gas discharged from the other unit such that the flow rate of the exhaust gas discharged from the one unit becomes constant.

6 Claims, 23 Drawing Sheets

(51) Int. Cl.

| | | |
|---|---|---|
| F23J 11/02 | (2006.01) | |
| F23N 3/08 | (2006.01) | |
| H01M 8/04007 | (2016.01) | |
| H01M 8/0438 | (2016.01) | |
| H01M 8/04746 | (2016.01) | |
| F24H 9/00 | (2006.01) | |
| F24D 17/00 | (2006.01) | |
| F24D 19/10 | (2006.01) | |

(52) U.S. Cl.
CPC ..... *F24D 17/0052* (2013.01); *F24D 19/1006* (2013.01); *F24H 9/0084* (2013.01); *H01M 8/04067* (2013.01); *H01M 8/04425* (2013.01); *H01M 8/04761* (2013.01); *H01M 8/04776* (2013.01); *F24D 2200/04* (2013.01); *F24D 2200/19* (2013.01); *F24H 2240/10* (2013.01); *H01M 8/0612* (2013.01); *H01M 2250/10* (2013.01); *Y02B 10/70* (2013.01); *Y02B 90/14* (2013.01)

(58) Field of Classification Search
CPC .......... H01M 8/04425; H01M 8/04776; F23N 3/082; F24H 2240/10; F24H 9/0084; Y02E 60/56; F23J 11/02; Y02B 10/70; F24D 17/0052; F24D 19/1006; F24D 2200/04
USPC ........................................ 429/423, 436, 444
See application file for complete search history.

(56) References Cited

U.S. PATENT DOCUMENTS

2009/0214759 A1    8/2009  Matsuoka et al.
2009/0280364 A1*  11/2009  Tsunoda et al. ................ 429/17

FOREIGN PATENT DOCUMENTS

| | | |
|---|---|---|
| EP | 1172874 A2 | 1/2002 |
| JP | 05-190478 A | 7/1993 |
| JP | 08-222248 A | 8/1996 |
| JP | 2005-093430 A | 4/2005 |
| JP | 2006-073446 A | 3/2006 |
| JP | 2006-229062 A | 8/2006 |
| JP | 2007-248009 A | 9/2007 |
| JP | 2008-210631 A | 9/2008 |
| JP | 2008-262849 A | 10/2008 |

OTHER PUBLICATIONS

Extended European Search Report dated Nov. 20, 2012 issued in corresponding European Patent Application No. 11849742.9.

* cited by examiner

POWER GENERATION SYSTEM AND METHOD OF OPERATING THE SAME

RELATED APPLICATIONS

This application is the U.S. National Phase under 35 U.S.C. §371 of International Application No. PCT/JP2011/006901, filed on Dec. 9, 2011, which in turn claims the benefit of Japanese Application No. 2010-276953, filed on Dec. 13, 2010, the disclosures of which Applications are incorporated by reference herein.

TECHNICAL FIELD

The present invention relates to a power generation system configured to supply heat and electricity and a method of operating the power generation system.

BACKGROUND ART

A cogeneration system supplies generated electric power to users for electric power loads and recovers and stores exhaust heat for hot water supply loads of the users, the exhaust heat being generated by the electric power generation. Known as this type of cogeneration system is a cogeneration system configured such that a fuel cell and a water heater operate by the same fuel (see PTL 1, for example). A cogeneration system disclosed in PTL 1 includes: a fuel cell; a heat exchanger configured to recover heat generated by the operation of the fuel cell; a hot water tank configured to store water having flowed through the heat exchanger to be heated; and a water heater configured to heat the water flowing out from the hot water tank up to a predetermined temperature, and is configured such that the fuel cell and the water heater operate by the same fuel.

Moreover, a fuel cell power generation apparatus provided inside a building is known, which is configured for the purpose of improving an exhaust performance of the fuel cell power generation apparatus (see PTL 2, for example). A power generation apparatus disclosed in PTL 2 is a fuel cell power generation apparatus provided and used in a building including an intake port and includes an air introducing port through which air in the building is introduced to the inside of the fuel cell power generation apparatus, an air discharging pipe through which the air in the fuel cell power generation apparatus is discharged to the outside of the building, and a ventilation unit. The ventilation unit introduces the air from the outside of the building through the intake port to the inside of the building, further introduces the air through the air introducing port to the inside of the fuel cell power generation apparatus, and discharges the air through the air discharging pipe to the outside of the building.

Further, a power generation apparatus including a duct extending in a vertical direction is known, which is configured for the purpose of improving the exhaust performance of an exhaust gas generated by a fuel cell provided inside a building (see PTL 3, for example). In a power generation apparatus disclosed in PTL 3, a duct extending inside a building in a vertical direction and having an upper end portion located outside the building is a double pipe, and a ventilating pipe and an exhaust pipe are coupled to the duct such that an exhaust gas or air flows through the inside or outside of the duct.

CITATION LIST

Patent Literature

PTL 1: Japanese Laid-Open Patent Application Publication No. 2007-248009
PTL 2: Japanese Laid-Open Patent Application Publication No. 2006-73446
PTL 3: Japanese Laid-Open Patent Application Publication No. 2008-210631

SUMMARY OF INVENTION

Technical Problem

Here, in the case of providing the cogeneration system disclosed in PTL 1 in a building, the below-described configuration may be adopted in reference to the power generation apparatus disclosed in PTL 2. To be specific, the configuration is that: a cogeneration unit including a fuel cell and a hot water supply unit including a water heater are separately provided; a ventilation fan is provided in the cogeneration unit; and an exhaust passage causing the cogeneration system and the water heater to communicate with each other (connecting the cogeneration system and the water heater) is formed.

In this configuration, for example, in a case where the water heater and the fuel cell system are operating, and then, the water heater is stopped, the discharge of the exhaust gas from the water heater to the exhaust passage stops. Therefore, the total flow rate of the exhaust gas flowing through the exhaust passage decreases, and the pressure loss of the exhaust passage decreases. With this, the load of a discharging device (such as an oxidizing gas supply unit or a combustion air supply unit configured to supply combustion air to a burner of a hydrogen generator) configured to discharge the exhaust gas to the exhaust passage in the fuel cell system decreases. At this time, the control of the discharging device may not be able to follow the change in the pressure loss, and therefore, the flow rate of the exhaust gas discharged to the exhaust passage may increases.

In a case where the fuel cell system is operating and the water heater is in a stop state, and then, the water heater is activated, the total flow rate of the exhaust gas flowing through the exhaust passage increases, and the load of the discharging device increases. At this time, the control of the discharging device may not be able to follow the change in the pressure loss, and therefore, the flow rate of a gas (such as air or a raw material) discharged from the discharging device may decrease.

As above, the problem is that in a case where one of the fuel cell system and the water heater is operating and the operation state of the other is changed, the control cannot follow the change in the pressure loss of the discharge passage, and therefore, the operation state of the other cannot be changed stably.

An object of the present invention is to provide a power generation system capable of operating stably in the case of providing an exhaust passage causing a fuel cell system and a combustion device to communicate with each other as above, and a method of operating the power generation system.

Solution to Problem

To solve the above conventional problems, a power generation system according to the present invention includes: a fuel cell unit including a fuel cell configured to generate electric power using a fuel gas and an oxidizing gas and a case configured to house the fuel cell; a controller; a combustion unit provided outside the case and configured to combust a combustible gas to supply heat; and a discharge passage configured to cause the fuel cell unit and the combustion unit to communicate with each other and provided to discharge a first exhaust gas from the fuel cell unit and a second exhaust gas from the combustion unit to an atmosphere, wherein in a case where an exhaust gas is being discharged to the discharge passage from one of the fuel cell unit and the combustion unit and the controller changes a flow rate of the exhaust gas discharged from the other unit, the controller controls at least the flow rate of the exhaust gas discharged from the other unit such that a flow rate of the exhaust gas discharged from the one unit becomes constant.

Here, the expression "a flow rate of the exhaust gas discharged from the one unit (that is one of the fuel cell unit and the combustion unit) becomes constant" does not denote that the flow rate of the exhaust gas discharged from one of the fuel cell unit and the combustion unit does not change at all but denotes that the flow rate of the exhaust gas is allowed to change to a level that the operations of devices constituting the power generation system, such as the electric power generation of the fuel cell, do not become unstable.

To be specific, in the power generation apparatus according to the present invention, in a case where the controller changes the flow rate of the exhaust gas from the other unit, the controller changes the flow rate of the exhaust gas from the other unit such that the flow rate of the exhaust gas from the one unit becomes constant (falls within a predetermined range). Preferably, the controller feedback-controls the fuel cell unit and the combustion unit such that the flow rate of the exhaust gas from each of the fuel cell unit and the combustion unit falls within a predetermined range, and in a case where the controller changes the flow rate of the exhaust gas from the other unit, the controller changes the flow rate of the exhaust gas from the other unit such that the controller can feedback-control the one unit.

With this, even if the operation state of one of the fuel cell unit and the combustion unit changes, the other unit that is operating can be stably operated.

In the power generation system according to the present invention, in a case where the exhaust gas is being discharged from the one unit to the discharge passage and the controller changes the flow rate of the exhaust gas discharged from the other unit, the controller may control the one unit and the other unit such that the flow rate of the exhaust gas discharged from the one unit becomes constant.

In the power generation system according to the present invention, in a case where the exhaust gas is being discharged from the one unit to the discharge passage at a constant flow rate and the controller changes the flow rate of the exhaust gas discharged from the other unit, the controller may restrict the rate of change of the flow rate of the exhaust gas discharged from the other unit such that the flow rate of the exhaust gas discharged from the one unit becomes constant.

In the power generation system according to the present invention, in a case where the exhaust gas is being discharged from the one unit to the discharge passage and the controller changes the flow rate of the exhaust gas discharged from the other unit, the controller may control the one unit and the other unit such that the amount of time in which the controller changes an operation amount of the other unit becomes equal to or larger than the amount of time in which the controller changes an operation amount of the one unit.

In the power generation system according to the present invention, in a case where the exhaust gas is being discharged from the one unit to the discharge passage and the controller changes the flow rate of the exhaust gas discharged from the other unit, the controller may control the other unit such that the rate of change of the operation amount of the other unit becomes lower than that in a case where the one unit is in a stop state and the controller changes the flow rate of the exhaust gas discharged from the other unit.

In the power generation system according to the present invention, in a case where the exhaust gas is being discharged from the one unit to the discharge passage and the controller changes the flow rate of the exhaust gas discharged from the other unit, the controller may control the other unit such that the amount of time in which the controller changes the operation amount of the other unit becomes larger than that in a case where the one unit is in a stop state and the controller changes the flow rate of the exhaust gas discharged from the other unit.

In the power generation system according to the present invention, the fuel cell unit may further include a hydrogen generator including a reformer configured to generate a hydrogen-containing fuel gas from a raw material and water and a combustor configured to heat the reformer, and the first exhaust gas may contain a flue gas discharged from the combustor.

Further, the power generation system according to the present invention may further include an air intake passage configured to have one end that is open to an atmosphere, branch such that the other ends thereof are respectively connected to the fuel cell unit and the combustion unit, and supply air therethrough to the fuel cell unit and the combustion unit, wherein the air intake passage may be provided so as to be heat-exchangeable with the discharge passage.

A method of operating a power generation system according to the present invention is a method of operating a power generation system, the power generation system including: a fuel cell unit including a fuel cell configured to generate electric power using a fuel gas and an oxidizing gas and a case configured to house the fuel cell; a controller; a combustion unit provided outside the case and configured to combust a combustible gas to supply heat; and a discharge passage configured to cause the fuel cell unit and the combustion unit to communicate with each other and provided to discharge a first exhaust gas from the fuel cell unit and a second exhaust gas from the combustion unit to an atmosphere, wherein in a case where an exhaust gas is being discharged to the discharge passage from one of the fuel cell unit and the combustion unit and the controller changes a flow rate of the exhaust gas discharged from the other unit, the controller controls at least the flow rate of the exhaust gas discharged from the other unit such that a flow rate of the exhaust gas discharged from the one unit becomes constant.

With this, even if the operation state of one of the fuel cell unit and the combustion unit changes, the other unit that is operating can be stably operated.

Advantageous Effects of Invention

According to the power generation system of the present invention and the method of operating the power generation system, even if the operation state of one of the fuel cell unit and the combustion unit changes, the other unit that is operating can be stably operated.

DESCRIPTION OF EMBODIMENTS

Figure 1:
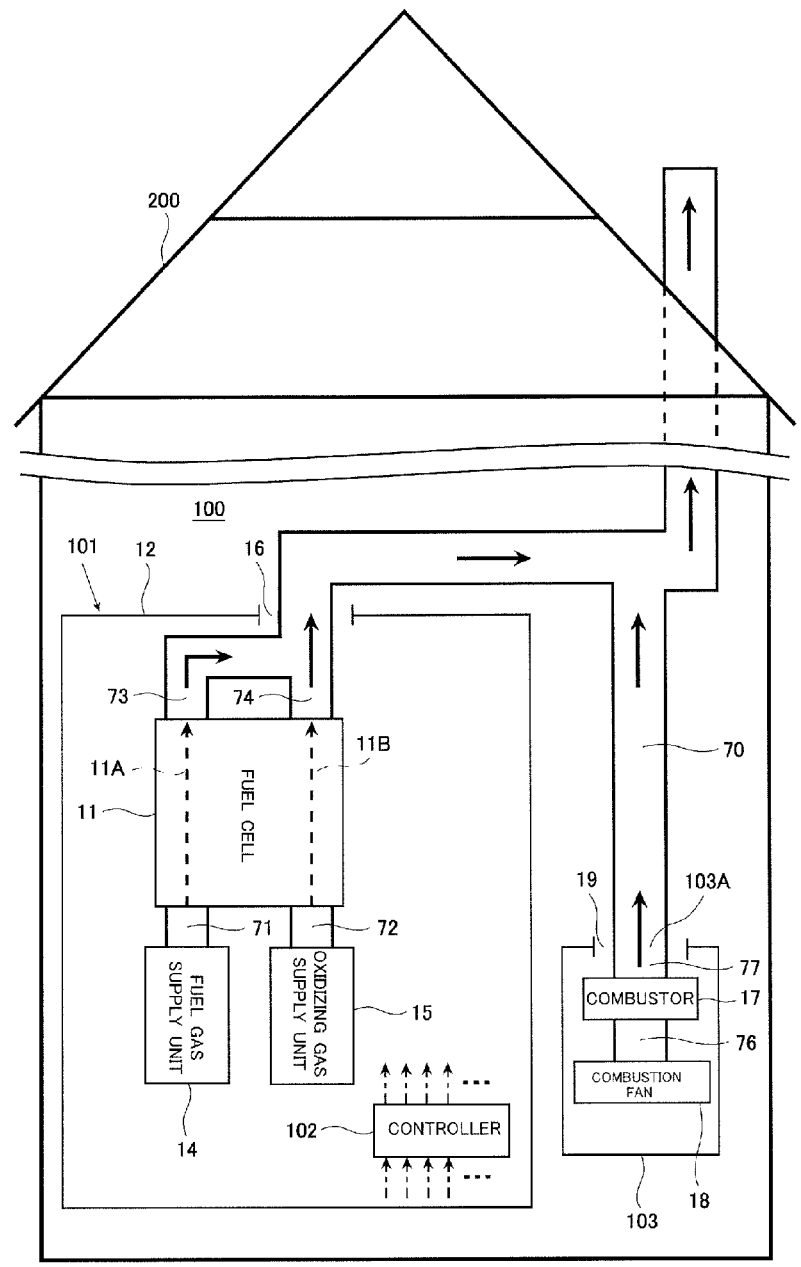
FIG. 1 is a schematic diagram showing the schematic configuration of a power generation system according to Embodiment 1 of the present invention.

Hereinafter, preferred embodiments of the present invention will be explained in reference to the drawings. In the drawings, the same reference signs are used for the same or corresponding components, and a repetition of the same explanation is avoided. Moreover, in the drawings, only components necessary to explain the present invention are shown, and the other components are not shown. Further, the present invention is not limited to the following embodiments.

Embodiment 1

A power generation system according to Embodiment 1 of the present invention includes: a fuel cell unit including a fuel cell configured to generate electric power using a fuel gas and an oxidizing gas and a case configured to house the fuel cell; a controller; a combustion unit provided outside the case and configured to combust a combustible gas to supply heat; and a discharge passage configured to cause the fuel cell unit and the combustion unit to communicate with each other and provided to discharge a first exhaust gas from the fuel cell unit and a second exhaust gas from the combustion unit to an atmosphere, wherein in a case where an exhaust gas is being discharged to the discharge passage from one of the fuel cell unit and the combustion unit and the controller changes a flow rate of the exhaust gas discharged from the other unit, the controller controls at least the flow rate of the exhaust gas discharged from the other unit such that a flow rate of the exhaust gas discharged from the one unit becomes constant.

Here, the expression "the flow rate of the exhaust gas discharged from the one unit (that is one of the fuel cell unit and the combustion unit) becomes constant" does not denote that the flow rate of the exhaust gas discharged from one of the fuel cell unit and the combustion unit does not change at all but denotes that the flow rate of the exhaust gas is allowed to change to a level that the operations of devices constituting the power generation system, such as the electric power generation of the fuel cell, do not become unstable. Therefore, the flow rate of the exhaust gas discharged from one of the units is generally allowed to change within a range of ±10%, although the range slightly differs depending on respective devices.

Configuration of Power Generation System

FIG. 1 is a schematic diagram showing the schematic configuration of the power generation system according to Embodiment 1 of the present invention.

As shown in FIG. 1, a power generation system 100 according to Embodiment 1 of the present invention is provided in a building 200. The power generation system 100 includes a fuel cell unit 101, a controller 102, a combustion unit 103, and a discharge passage 70. The fuel cell unit 101 includes a fuel cell 11 and a case 12. A fuel gas supply unit 14 and an oxidizing gas supply unit 15 are provided in the case 12. The discharge passage 70 is formed so as to cause the case 12 of the fuel cell unit 101 and an exhaust port 103A of the combustion unit 103 to communicate with each other (so as to connect the case 12 of the fuel cell unit 101 and the exhaust port 103A of the combustion unit 103). In a case where the exhaust gas is being discharged to the discharge passage 70 from one of the fuel cell unit 101 and the combustion unit 103 and the controller 102 changes the flow rate of the exhaust gas discharged from the other unit, the controller 102 controls at least the flow rate of the exhaust gas discharged from the other unit such that the flow rate of the exhaust gas discharged from the one unit becomes constant.

In Embodiment 1, the power generation system 100 is provided in the building 200. However, the present embodiment is not limited to this. The power generation system 100 may be provided outside the building 200 as long as the discharge passage 70 is formed so as to cause the case 12 of the fuel cell unit 101 and the exhaust port 103A of the combustion unit 103 to communicate with each other (so as to connect the case 12 of the fuel cell unit 101 and the exhaust port 103A of the combustion unit 103).

The fuel cell 11, the fuel gas supply unit 14, and the oxidizing gas supply unit 15 are provided in the case 12 of the fuel cell unit 101. The controller 102 is also provided in the case 12. In Embodiment 1, the controller 102 is provided in the case 12 of the fuel cell unit 101. However, the present embodiment is not limited to this. The controller 102 may be provided in the combustion unit 103 or may be provided separately from the case 12 and the combustion unit 103.

A hole 16 penetrating a wall constituting the case 12 in a thickness direction of the wall is formed at an appropriate position of the wall. A pipe constituting the discharge passage 70 is inserted through the hole 16 such that a gap is formed between the hole 16 and the discharge passage 70. The gap between the hole 16 and the discharge passage 70 constitutes an air supply port 16. With this, the air outside the power generation system 100 is supplied through the air supply port 16 to the inside of the case 12.

In Embodiment 1, the hole through which the pipe constituting the discharge passage 70 is inserted and the hole constituting the air supply port 16 are constituted by one hole 16. However, the present embodiment is not limited to this. The hole through which the pipe constituting the discharge passage 70 is inserted and the hole constituting the air supply port 16 may be separately formed on the case 12. The air supply port 16 may be constituted by one hole on the case 12 or may be constituted by a plurality of holes on the case 12.

The fuel gas supply unit 14 may have any configuration as long as it can supply a fuel gas (hydrogen gas) to the fuel cell 11 while adjusting the flow rate of the fuel gas. The fuel gas supply unit 14 may be configured by a device, such as a hydrogen generator, a hydrogen bomb, or a hydrogen absorbing alloy, configured to supply the hydrogen gas. The fuel cell 11 (to be precise, an inlet of a fuel gas channel 11A of the fuel cell 11) is connected to the fuel gas supply unit 14 through a fuel gas supply passage 71.

The oxidizing gas supply unit 15 may have any configuration as long as it can supply an oxidizing gas (air) to the fuel cell 11 while adjusting the flow rate of the oxidizing gas. The oxidizing gas supply unit 15 may be constituted by a fan, a blower, or the like. The fuel cell 11 (to be precise, an inlet of an oxidizing gas channel 11B of the fuel cell 11) is connected to the oxidizing gas supply unit 15 through an oxidizing gas supply passage 72.

The fuel cell 11 includes an anode and a cathode (both not shown). In the fuel cell 11, the fuel gas supplied to the fuel gas channel 11A is supplied to the anode while the fuel gas is flowing through the fuel gas channel 11A. The oxidizing gas supplied to the oxidizing gas channel 11B is supplied to the cathode while the oxidizing gas is flowing through the oxidizing gas channel 11B. The fuel gas supplied to the anode and the oxidizing gas supplied to the cathode react with each other to generate electricity and heat.

The generated electricity is supplied to an external electric power load (for example, a home electrical apparatus) by an electric power conditioner, not shown. The generated heat is recovered by a heat medium flowing through a heat medium channel, not shown. The heat recovered by the heat medium can be used to, for example, heat water. Or, only the generated electricity may be utilized, and the heat may be discarded.

In Embodiment 1, each of various fuel cells, such as a polymer electrolyte fuel cell, a direct internal reforming type solid-oxide fuel cell, and an indirect internal reforming type solid-oxide fuel cell, may be used as the fuel cell 11. In Embodiment 1, the fuel cell 11 and the fuel gas supply unit 14 are configured separately. However, the present embodiment is not limited to this. Like a solid-oxide fuel cell, the fuel gas supply unit 14 and the fuel cell 11 may be configured integrally. In this case, the fuel cell 11 and the fuel gas supply unit 14 are configured as one unit covered with a common heat insulating material, and a combustor 14b can heat not only a reformer 14a but also the fuel cell 11. In the direct internal reforming type solid-oxide fuel cell, since the anode of the fuel cell 11 has the function of the reformer 14a, the anode of the fuel cell 11 and the reformer 14a may be configured integrally. Further, since the configuration of the fuel cell 11 is similar to that of a typical fuel cell, a detailed explanation thereof is omitted.

An upstream end of an off fuel gas passage 73 is connected to an outlet of the fuel gas channel 11A. A downstream end of the off fuel gas passage 73 is connected to the discharge passage 70. An upstream end of an off oxidizing gas passage 74 is connected to an outlet of the oxidizing gas channel 11B. A downstream end of the off oxidizing gas passage 74 is connected to the discharge passage 70.

With this, the fuel gas unconsumed in the fuel cell 11 (hereinafter referred to as an "off fuel gas") is discharged from the outlet of the fuel gas channel 11A through the off fuel gas passage 73 to the discharge passage 70. The oxidizing gas unconsumed in the fuel cell 11 (hereinafter referred to as an "off oxidizing gas") is discharged from the outlet of the oxidizing gas channel 11B through the off oxidizing gas passage 74 to the discharge passage 70. The off fuel gas discharged to the discharge passage 70 is diluted by the off oxidizing gas to be discharged to the outside of the building 200. As above, in Embodiment 1, the off fuel gas and the off oxidizing gas are exemplified as a first exhaust gas discharged from the fuel cell unit 101. The exhaust gas discharged from the fuel cell unit 101 is not limited to these gases. For example, in a case where the fuel gas supply unit 14 is constituted by a hydrogen generator, the exhaust gas discharged from the fuel cell unit 101 may be the gas (a flue gas, a hydrogen-containing gas, or the like) discharged from the hydrogen generator or may be the gas (mainly the air) in the case 12.

The combustion unit 103 includes a combustor 17 and a combustion fan 18. The combustor 17 and the combustion fan 18 are connected to each other through a combustion air supply passage 76. The combustion fan 18 may have any configuration as long as it can supply combustion air to the combustor 17. The combustion fan 18 may be constituted by a fan, a blower, or the like.

A combustible gas, such as a natural gas, and a combustion fuel, such as a liquid fuel, are supplied to the combustor 17 from a combustion fuel supply unit, not shown. One example of the liquid fuel is kerosene. The combustor 17 combusts the combustion air supplied from the combustion fan 18 and the combustion fuel supplied from the combustion fuel supply unit to generate heat and a flue gas. The generated heat can be used to heat water. To be specific, the combustion unit 103 may be used as a boiler.

An upstream end of an exhaust gas passage 77 is connected to the combustor 17, and a downstream end of the exhaust gas passage 77 is connected to the discharge passage 70. With this, the flue gas generated in the combustor 17 is discharged through the exhaust gas passage 77 to the discharge passage 70. To be specific, the flue gas generated in the combustor 17 is discharged to the discharge passage 70 as a second exhaust gas discharged from the combustion unit 103. The flue gas discharged to the discharge passage 70 flows through the discharge passage 70 to be discharged to the outside of the building 200.

The second exhaust gas discharged from the combustion unit 103 is not limited to the flue gas. For example, the combustion air discharged to the discharge passage 70 when only the combustion fan 18 is operated can also be exemplified as the second exhaust gas. Moreover, for example, the combustion fuel discharged to the discharge passage 70 when only the combustion fuel supply unit, not shown, is operated can also be exemplified as the second exhaust gas.

A hole 19 penetrating a wall constituting the combustion unit 103 in a thickness direction of the wall is formed at an appropriate position of the wall. A pipe constituting the discharge passage 70 is inserted through the hole 19 such that a gap is formed between the hole 19 and the discharge passage 70. The gap between the hole 19 and the discharge passage 70 constitutes an air supply port 19. With this, the air outside the power generation system 100 is supplied through the air supply port 19 to the inside of the combustion unit 103.

To be specific, the discharge passage 70 branches, and two upstream ends thereof are respectively connected to the hole 16 and the hole 19. The discharge passage 70 is formed to extend up to the outside of the building 200, and a downstream end (opening) thereof is open to the atmosphere. With this, the discharge passage 70 causes the case 12 and the exhaust port 103A of the combustion unit 103 to communicate with each other.

In Embodiment 1, the hole through which the pipe constituting the discharge passage 70 is inserted and the hole constituting the air supply port 19 are constituted by one hole 19. However, the present embodiment is not limited to this. The hole through which the pipe constituting the discharge passage 70 is inserted (the hole to which the pipe constituting the discharge passage 70 is connected) and the hole constituting the air supply port 19 may be separately formed on the combustion unit 103. The air supply port 19 may be constituted by one hole on the combustion unit 103 or may be constituted by a plurality of holes on the combustion unit 103.

The controller 102 may be any device as long as it controls respective devices constituting the power generation system 100. The controller 102 includes a calculation processing portion, such as a microprocessor or a CPU, and a storage portion, such as a memory, configured to store programs for executing respective control operations. In the controller 102, the calculation processing portion reads out and executes a predetermined control program stored in the storage portion. Thus, the controller 102 processes the information and performs various control operations, such as the above control operations, regarding the power generation system 100.

The controller 102 may be constituted by a single controller or may be constituted by a group of a plurality of controllers which cooperate to execute control operations of the power generation system 100. The controller 102 may be constituted by a microcomputer or may be constituted by a MPU, a PLC (Programmable Logic Controller), a logic circuit, or the like.

Operations of Power Generation System

Next, the operations of the power generation system 100 according to Embodiment 1 will be explained in reference to FIGS. 1 to 5. Since the electric power generating operation of the fuel cell unit 101 of the power generation system 100 is performed in the same manner as the electric power generating operation of a typical fuel cell system, a detailed explanation thereof is omitted. Embodiment 1 is explained on the basis that the controller 102 is constituted by one controller and the controller controls respective devices constituting the power generation system 100.

First, operations performed in a case where the fuel cell unit 101 is operating and the controller 102 changes the flow rate of the exhaust gas discharged from the combustion unit 103 will be explained in reference to FIGS. 1 to 3B.

Figure 2:
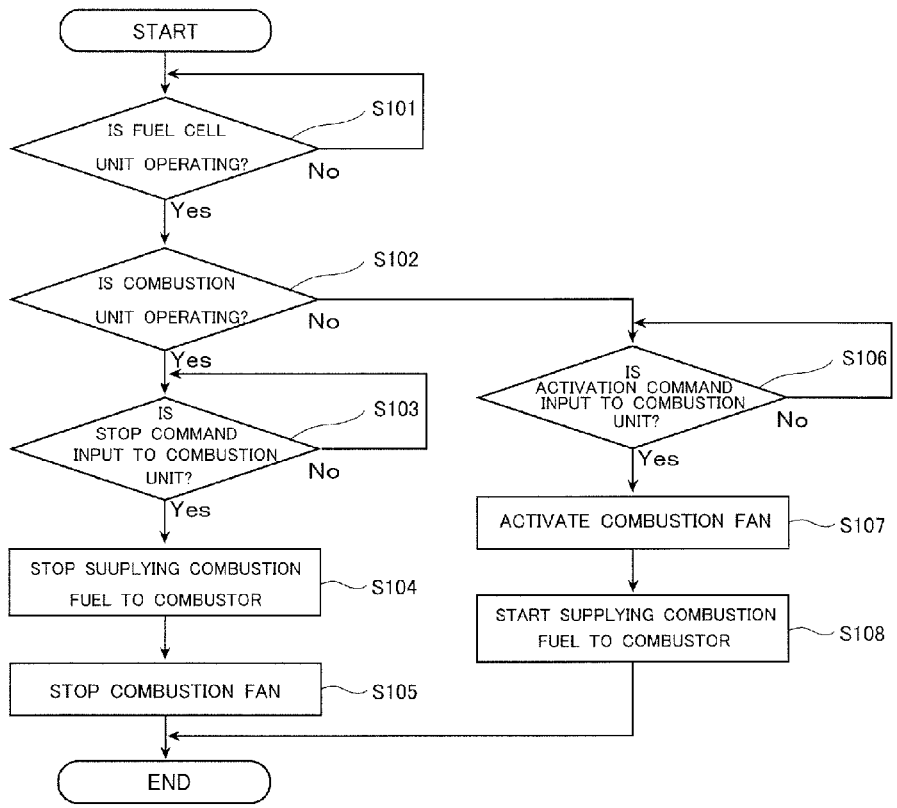
FIG. 2 is a flow chart schematically showing an exhaust gas flow rate control operation of the power generation system according to Embodiment 1.
Figure 3A:
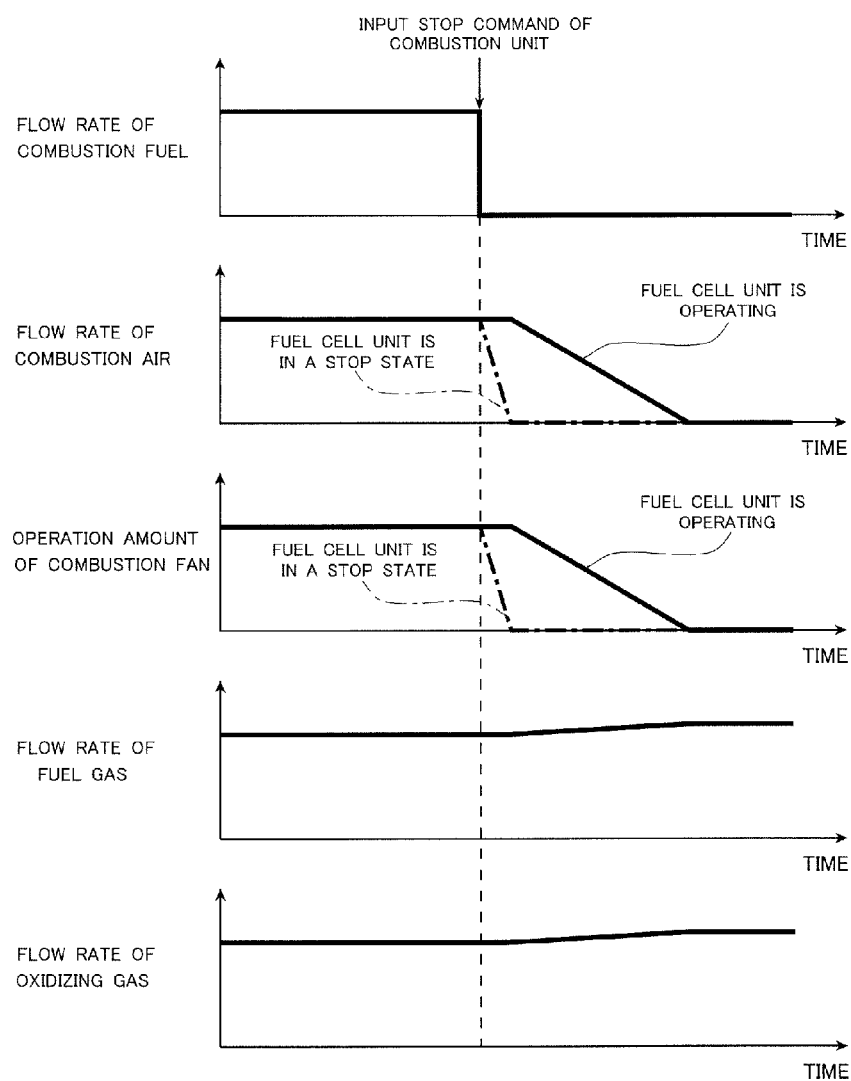
FIG. 3A is a time chart showing the operations of major components constituting the power generation system in Steps S103 to S105 in the flow chart shown in FIG. 2.
Figure 3B:
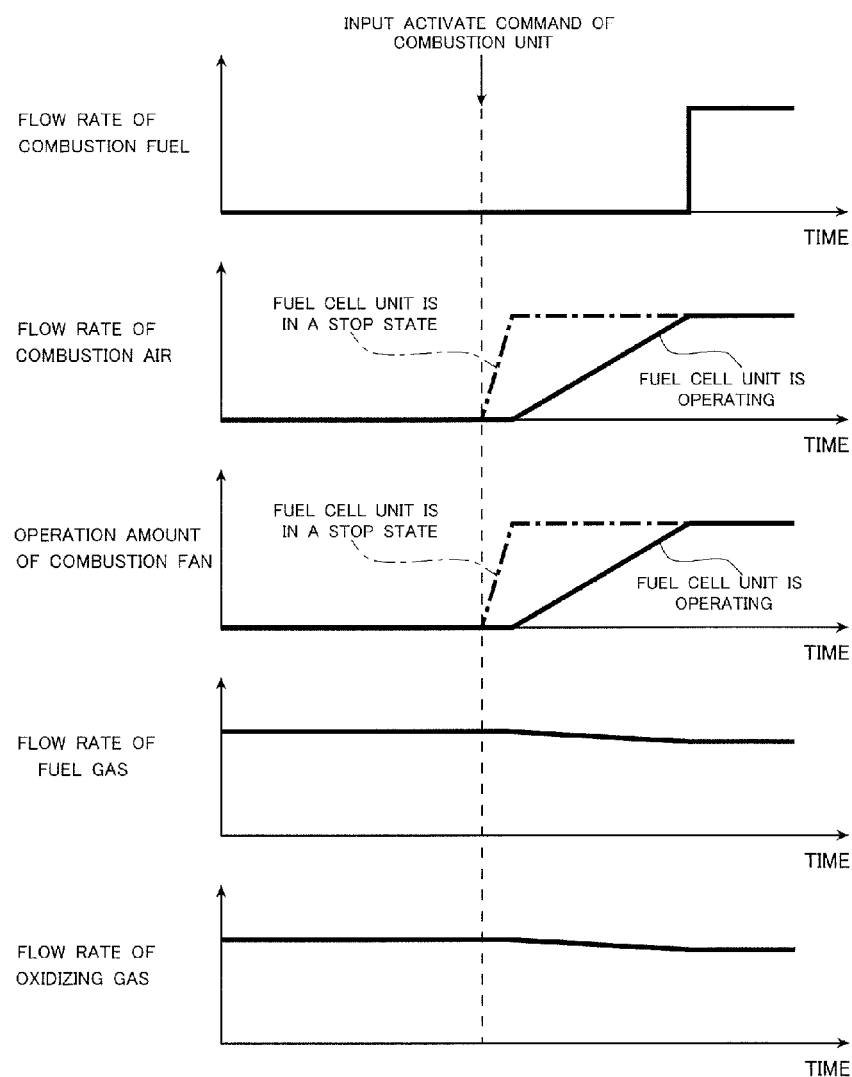
FIG. 3B is a time chart showing the operations of the major components constituting the power generation system in Steps S106 to S108 in the flow chart shown in FIG. 2.

FIG. 2 is a flow chart schematically showing the exhaust gas flow rate control operation of the power generation system according to Embodiment 1. FIG. 3A is a time chart showing the operations of the major components constituting the power generation system in Steps S103 to S105 in the flow chart shown in FIG. 2. FIG. 3B is a time chart showing the operations of the major components constituting the power generation system in Steps S106 to S108 in the flow chart shown in FIG. 2.

As shown in FIG. 2, the controller 102 confirms whether or not the fuel cell unit 101 is operating (Step S101). When the fuel cell unit 101 is not operating (No in Step S101), the controller 102 repeats Step S101 until the controller 102 confirms that the fuel cell unit 101 is operating. In contrast, when the fuel cell unit 101 is operating (Yes in Step S101), the controller 102 proceeds to Step S102.

In Step S102, the controller 102 determines whether or not the combustion unit 103 is operating. When the combustion unit 103 is in a stop state (No in Step S102), the controller 102 proceeds to Step S106. In contrast, when the combustion unit 103 is operating (Yes in Step S102), the controller 102 proceeds to Step S103.

In Step S103, the controller 102 confirms whether or not a stop command is input to the combustion unit 103. Examples of a case where the stop command of the combustion unit 103 is input are a case where a user of the power generation system 100 operates a remote controller, not shown, to instruct the stop of the combustion unit 103 and a case where a preset operation stop time of the combustion unit 103 has come.

When the stop command of the combustion unit 103 is not input (No in Step S103), the controller 102 repeats Step S103 until the stop command of the combustion unit 103 is input. In this case, the controller 102 may return to Step S101 and repeat Steps S101 to S103 until the controller 102 determines that the fuel cell unit 101 and the combustion unit 103 are operating and the stop command of the combustion unit 103 is input. Moreover, in this case, the controller 102 may return to Step S102 and repeat Steps S102 and S103 until the controller 102 determines that the combustion unit 103 is operating and the stop command of the combustion unit 103 is input.

In contrast, when the stop command of the combustion unit 103 is input (Yes in Step S103), the controller 102 proceeds to Step S104. In Step S104, the controller 102 stops the supply of the combustion fuel from the combustion fuel supply unit, not shown, to the combustor 17 (see FIG. 3A).

Next, the controller 102 stops the combustion fan 18 (Step S105). At this time, the controller 102 controls the combustion fan 18 such that the flow rate of the first exhaust gas (at least one of the off fuel gas and the off oxidizing gas) discharged from the fuel cell unit 101 (at least one of the fuel gas supply unit 14 and the oxidizing gas supply unit 15) becomes constant. That is, the controller 102 controls the rate of change of the flow rate of the second exhaust gas (herein, the combustion air) discharged from the combustion unit 103 (herein, the combustion fan 18).

For example, the controller 102 may control the combustion unit 103 such that the rate of change of the flow rate of the combustion air discharged from the combustion unit 103 (to be more precise, the combustion fan 18) becomes lower than that in a case where the fuel cell unit 101 is in a stop state and the controller 102 stops the combustion unit 103 (to be more precise, the combustion fan 18). Moreover, for example, the controller 102 may control the combustion unit 103 such that the amount of time in which the controller 102 changes the operation amount of the combustion unit 103 (to be more precise, the combustion fan 18) becomes larger than that in a case where the fuel cell unit 101 is in a stop state and the controller 102 stops the combustion unit 103 (to be more precise, the combustion fan 18).

Here, the exhaust gas flow rate control operation performed in a case where the fuel cell unit 101 and the combustion unit 103 are operating and the controller 102 stops the combustion unit 103 will be more specifically explained in reference to FIG. 3A.

As shown in FIG. 3A, each of the fuel cell unit 101 and the combustion unit 103 is operating at a steady state (Yes in each of Steps S101 and S102 in FIG. 2). When the stop command of the combustion unit 103 is input to the controller 102 (Yes in Step S103 in FIG. 2), the controller 102 stops the combustion fuel supply unit, not shown (Step S104 in FIG. 2).

Next, the controller 102 gradually decreases the operation amount of the combustion fan 18 to stop the combustion fan 18 (Step S105 in FIG. 2). By gradually decreasing the operation amount of the combustion fan 18, the pressure loss of the discharge passage 70 gradually decreases. Therefore, the change in the flow rate of the first exhaust gas (the off fuel gas or the off oxidizing gas) discharged from the fuel gas supply unit 14 or the oxidizing gas supply unit 15 to the discharge passage 70 becomes slight. On this account, the change in the amount of fuel gas supplied to the fuel cell 11 or the change in the amount of oxidizing gas supplied to the fuel cell 11 becomes slight. Thus, the change in the utilization ratio of each of the fuel gas and the oxidizing gas can be suppressed, and the significant decrease in the utilization ratio of each of these gases can be suppressed. Therefore, in the power generation system 100 according to Embodiment 1, the fuel cell unit 101 can be stably, efficiently operated.

Moreover, for example, the controller 102 may stop the combustion fan 18 such that the amount of time in which the controller 102 changes the operation amount of the combustion fan 18 becomes larger than that in a case where the fuel cell unit 101 is in a stop state and the controller 102 stops the combustion fan 18 (chain double-dashed line in FIG. 3A). With this, the rate of change of the flow rate of the second exhaust gas (the combustion air) discharged from combustion fan 18 to the discharge passage 70 can be made lower than that in a case where the fuel cell unit 101 is in a stop state and the controller 102 stops the combustion fan 18.

In contrast, in FIG. 2, when the combustion unit 103 is in a stop state (No in Step S102), the controller 102 proceeds to Step S106. In Step S106, the controller 102 confirms whether or not an activation command of the combustion unit 103 is input. Examples of a case where the activation command of the combustion unit 103 is input are a case where the user of the power generation system 100 operates a remote controller, not shown, to instruct the activation of the combustion unit 103 and a case where a preset operation start time of the combustion unit 103 has come.

When the activation command of the combustion unit 103 is not input (No in Step S106), the controller 102 repeats Step S106 until the activation command of the combustion unit 103 is input. In this case, the controller 102 may return to Step S101 and repeats Steps S101, S102, and S106 until the controller 102 determines that the fuel cell unit 101 is operating, the combustion unit 103 is in a stop state, and the activation command of the combustion unit 103 is input.

In contrast, when the activation command of the combustion unit 103 is input (Yes in Step S106), the controller 102 proceeds to Step S107. In Step S107, the controller 102 activates the combustion fan 18.

At this time, the controller 102 controls the combustion fan 18 such that the flow rate of the first exhaust gas (at least one of the off fuel gas and the off oxidizing gas) discharged from the fuel cell unit 101 (at least one of the fuel gas supply unit 14 and the oxidizing gas supply unit 15) becomes constant. That is, the controller 102 controls the rate of change of the flow rate of the second exhaust gas (herein, the combustion air) discharged from the combustion unit 103 (herein, the combustion fan 18).

For example, the controller 102 may control the combustion unit 103 such that the rate of change of the flow rate of the combustion air discharged from the combustion unit 103 (to be more precise, the combustion fan 18) becomes lower than that in a case where the fuel cell unit 101 is in a stop state and the controller 102 activates the combustion unit 103 (to be more precise, the combustion fan 18). Moreover, for example, the controller 102 may control the combustion unit 103 such that the amount of time in which the controller 102 changes the operation amount of the combustion unit 103 (to be more precise, the combustion fan 18) becomes larger than that in a case where the fuel cell unit 101 is in a stop state and the controller 102 activates the combustion unit 103 (to be more precise, the combustion fan 18).

Next, the controller 102 causes the combustion fuel supply unit (not shown) to supply the combustion fuel to the combustor 17 (Step S108). With this, the combustor 17 combusts the supplied combustion fuel and combustion air to generate the flue gas. The flue gas generated in the combustion unit 103 flows through the discharge passage 70 to be discharged to the outside of the building 200.

Here, the exhaust gas flow rate control operation performed in a case where the fuel cell unit 101 is operating, the combustion unit 103 is in a stop state, and the controller 102 activates the combustion unit 103 will be more specifically explained in reference to FIG. 3B.

As shown in FIG. 3B, the fuel cell unit 101 is operating at a steady state, and the combustion unit 103 is in a stop state (Yes in Step S101 and No in Step S102 in FIG. 2). Then, the activation command of the combustion unit 103 is input to the controller 102 (Yes in Step S106 in FIG. 2).

Then, the controller 102 gradually increases the operation amount of the combustion fan 18 to activate the combustion fan 18 (Step S107 in FIG. 2). By gradually increasing the operation amount of the combustion fan 18, the pressure loss of the discharge passage 70 gradually increases. Therefore, the flow rate of the first exhaust gas (the off fuel gas or the off oxidizing gas) discharged from the fuel gas supply unit 14 or the oxidizing gas supply unit 15 to the discharge passage 70 just gradually decreases. On this account, the shortage of the fuel gas or the oxidizing gas in the fuel cell 11 can be suppressed. Therefore, in the power generation system 100 according to Embodiment 1, the fuel cell unit 101 can be stably, efficiently operated.

Moreover, for example, the controller 102 may change the operation amount of the combustion fan 18 up to a target operation amount by using a longer time than a case where the fuel cell unit 101 is in a stop state and the controller 102 activates the combustion fan 18 (chain double-dashed line in FIG. 3B). With this, the rate of change of the flow rate of the second exhaust gas (combustion air) discharged from the combustion fan 18 to the discharge passage 70 can be made lower than that in a case where the fuel cell unit 101 is in a stop state and the controller 102 activates the combustion fan 18.

After that, the controller 102 causes the combustion fuel supply unit (not shown) to supply the combustion fuel to the combustor 17 (Step S108). With this, the combustor 17 combusts the combustion fuel and the combustion air to generate the flue gas. The generated flue gas is discharged through the exhaust gas passage 77 to the discharge passage 70.

Next, operations performed in a case where the combustion unit 103 is operating and the controller 102 changes the flow rate of the exhaust gas discharged from the fuel cell unit 101 will be explained in reference to FIGS. 1, 4, 5A, and 5B.

Figure 4:
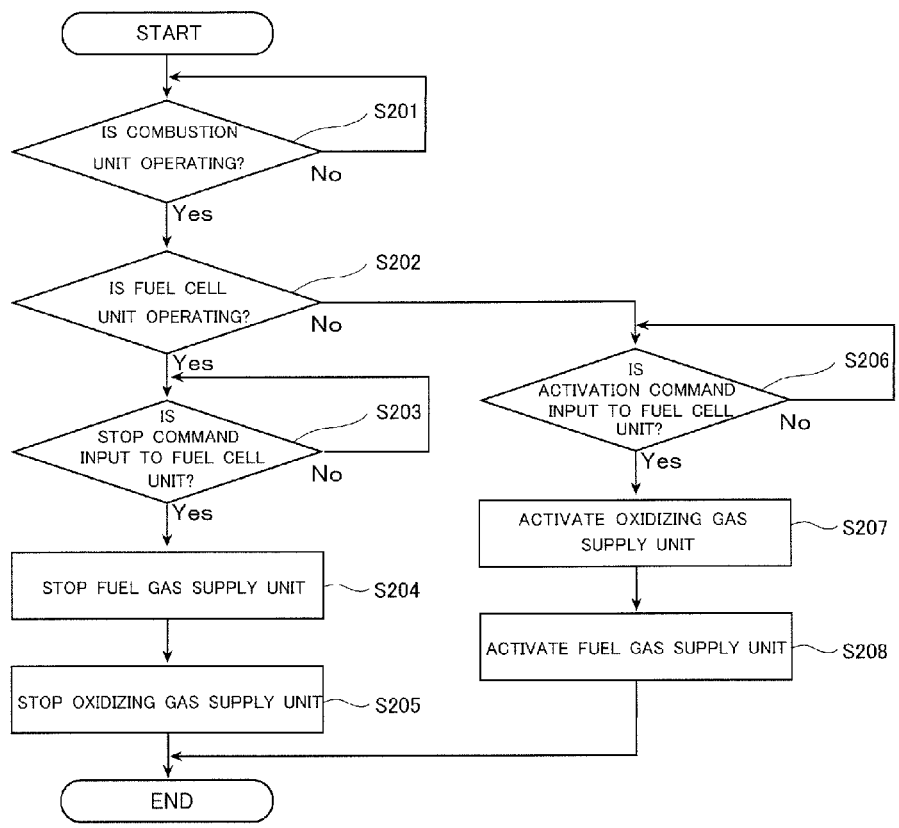
FIG. 4 is a flow chart schematically showing the exhaust gas flow rate control operation of the power generation system according to Embodiment 1.
Figure 5A:
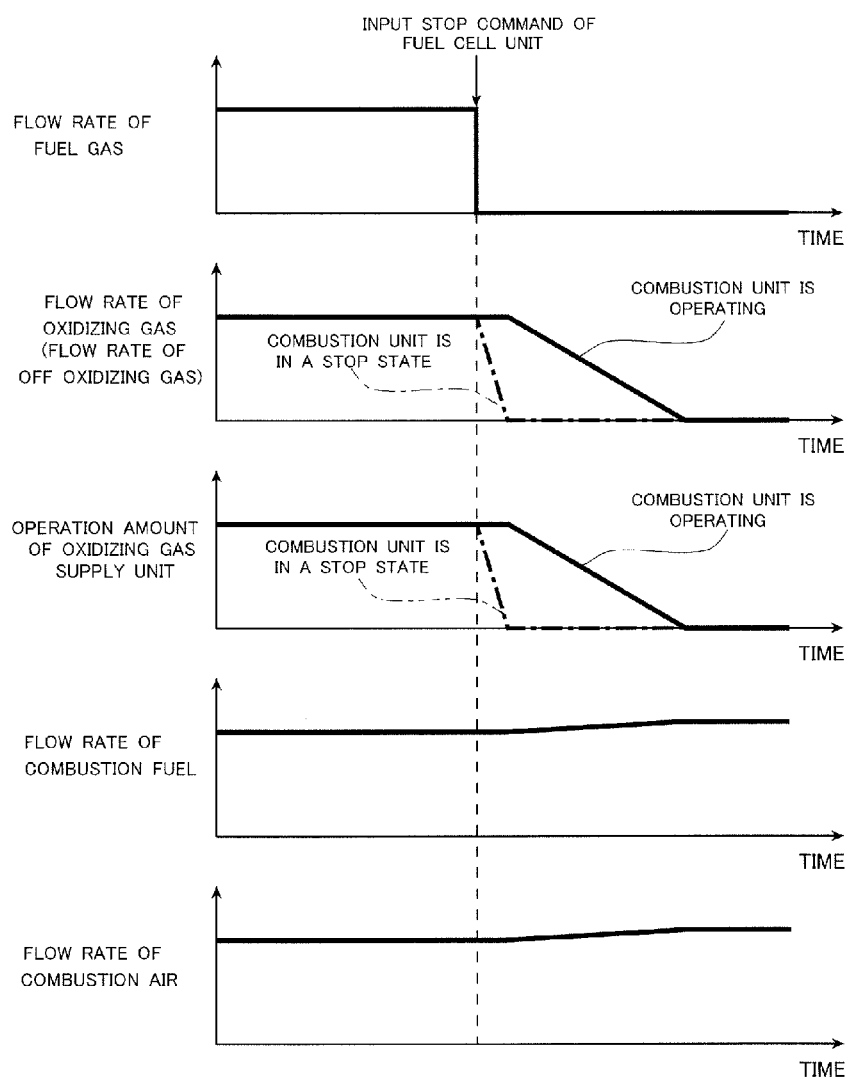
FIG. 5A is a time chart showing the operations of the major components constituting the power generation system in Steps S203 to S205 in the flow chart shown in FIG. 4.
Figure 5B:
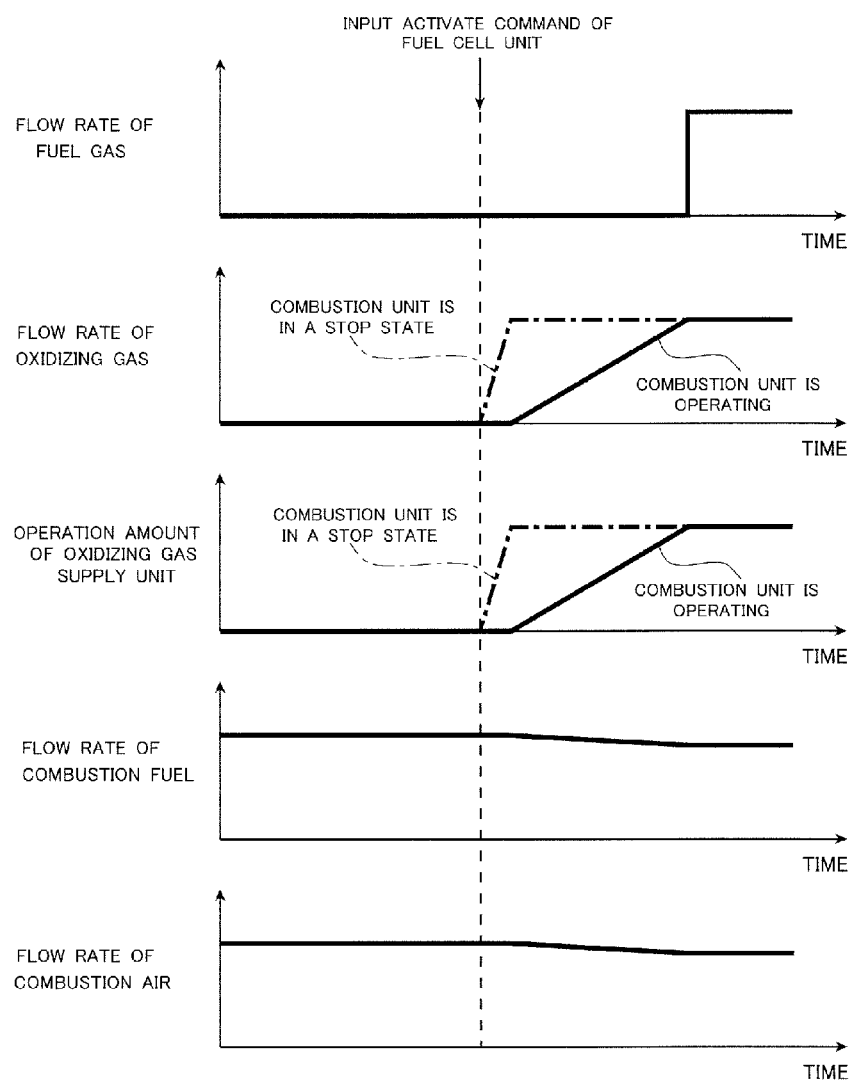
FIG. 5B is a time chart showing the operations of the major components constituting the power generation system in Steps S206 to S208 in the flow chart shown in FIG. 4.

FIG. 4 is a flow chart schematically showing the exhaust gas flow rate control operation of the power generation system according to Embodiment 1. FIG. 5A is a time chart showing the operations of the major components constituting the power generation system in Steps S203 to S205 in the flow chart shown in FIG. 4. FIG. 5B is a time chart showing the operations of the major components constituting the power generation system in Steps S206 to S208 in the flow chart shown in FIG. 4.

As shown in FIG. 4, the controller 102 confirms whether or not the combustion unit 103 is operating (Step S201). When the combustion unit 103 is not operating (No in Step S201), the controller 102 repeats Step S201 until the controller confirms that the combustion unit 103 is operating. In contrast, when the combustion unit 103 is operating (Yes in Step S201), the controller 102 proceeds to Step S202.

In Step S202, the controller 102 determines whether or not the fuel cell unit 101 is operating. When the fuel cell unit 101 is in a stop state (No in Step S202), the controller 102 proceeds to Step S206. In contrast, when the fuel cell unit 101 is operating (Yes in Step S202), the controller 102 proceeds to Step S203.

In Step S203, the controller 102 confirms whether or not the stop command is input to the fuel cell unit 101. Examples of a case where the stop command of the fuel cell unit 101 is input is a case where the user of the power generation system 100 operates a remote controller, not shown, to instruct the stop of the fuel cell unit 101 and a case where a preset operation stop time of the fuel cell unit 101 has come.

When the stop command of the fuel cell unit 101 is not input (No in Step S203), the controller 102 repeats Step S203 until the stop command of the fuel cell unit 101 is input. In this case, the controller 102 may return to Step S201 and repeat Steps S201 to S203 until the controller 102 confirms that the combustion unit 103 and the fuel cell unit 101 are operating and the stop command of the fuel cell unit 101 is input. Moreover, in this case, the controller 102 may return to Step S202 and repeat Steps S202 and S203 until the controller 102 confirms that the fuel cell unit 101 is operating and the stop command of the fuel cell unit 101 is input.

In contrast, when the stop command of the fuel cell unit 101 is input (Yes in Step S203), the controller 102 proceeds to Step S204. In Step S204, the controller 102 stops supplying the fuel gas from the fuel gas supply unit 14 to the fuel cell 11 (see FIG. 5A).

Next, the controller 102 stops the oxidizing gas supply unit 15 (Step S205). At this time, the controller 102 controls the oxidizing gas supply unit 15 such that the flow rate of the second exhaust gas (herein, the flue gas) discharged from the combustion unit 103 becomes constant. That is, the controller 102 controls the rate of change of the flow rate of the first exhaust gas (herein, the oxidizing gas (air)) discharged from the fuel cell unit 101 (to be precise, the oxidizing gas supply unit 15).

For example, the controller 102 may control the oxidizing gas supply unit 15 such that the rate of change of the flow rate of the oxidizing gas (the off oxidizing gas) discharged from the oxidizing gas supply unit 15 through the oxidizing gas supply passage 72, the oxidizing gas channel 11B, and the off oxidizing gas passage 74 to the discharge passage 70 becomes lower than that in a case where the combustion unit 103 is in a stop state and the controller 102 stops the fuel cell unit 101 (to be precise, the oxidizing gas supply unit 15). Moreover, for example, the controller 102 may control the oxidizing gas supply unit 15 such that the amount of time in which the controller 102 changes the operation amount of the oxidizing gas supply unit 15 becomes larger than that in a case where the combustion unit 103 is in a stop state and the controller 102 stops the fuel cell unit 101 (to be precise, the oxidizing gas supply unit 15).

Here, the exhaust gas flow rate control operation performed in a case where the combustion unit 103 and the fuel cell unit 101 are operating and the controller 102 stops the fuel cell unit 101 will be more specifically explained in reference to FIG. 5A.

As shown in FIG. 5A, each of the combustion unit 103 and the fuel cell unit 101 is operating at a steady state (Yes in each of Steps S201 and S202 in FIG. 4). When the stop command of the fuel cell unit 101 is input to the controller 102 (Yes in Step S203 in FIG. 4), the controller 102 stops the fuel gas supply unit 14 (Step S204 in FIG. 4).

Next, the controller 102 gradually decreases the operation amount of the oxidizing gas supply unit 15 to stop the oxidizing gas supply unit 15 (Step S205 in FIG. 4). By gradually decreasing the operation amount of the oxidizing gas supply unit 15, the pressure loss of the discharge passage 70 gradually decreases. Therefore, the flow rate of the second exhaust gas (the flue gas) discharged from the combustion unit 103 to the discharge passage 70 gradually increases. With this, the flow rate of the combustion fuel supplied from the combustion fuel supply unit (not shown) to the combustor 17 and the flow rate of the combustion air supplied from the combustion fan 18 to the combustor 17 just gradually increase. On this account, the deviation of the air-fuel ratio in the combustion unit 103 can be suppressed to a small extent, and the change of the combustion state in the combustion unit 103 (the combustor 17) also becomes slight. Thus, in the power generation system 100 according to Embodiment 1, the combustion unit 103 can be stably operated.

For example, the controller 102 may stop the oxidizing gas supply unit 15 such that the amount of time in which the controller 102 changes the operation amount of the oxidizing gas supply unit 15 becomes larger than that in a case where the combustion unit 103 is in a stop state and the controller 102 stops the oxidizing gas supply unit 15 (chain double-dashed line in FIG. 5A). With this, the rate of change of the flow rate of the first exhaust gas (the off oxidizing gas) discharged from the oxidizing gas supply unit 15 to the discharge passage 70 can be made lower than that in a case where the combustion unit 103 is in a stop state and the controller 102 stops the oxidizing gas supply unit 15.

In contrast, in FIG. 4, when the fuel cell unit 101 is in a stop state (No in Step S202), the controller 102 proceeds to Step S206. In Step S206, the controller 102 confirms whether or not the activation command of the fuel cell unit 101 is input. Examples of a case where the activation command of the fuel cell unit 101 is input are a case where the user of the power generation system 100 operates a remote controller, not shown, to instruct the activation of the fuel cell unit 101 and a case where the preset operation start time of the fuel cell unit 101 has come.

When the activation command of the fuel cell unit 101 is not input (No in Step S206), the controller 102 repeats Step S206 until the activation command of the fuel cell unit 101 is input. In this case, the controller 102 may return to Step S201 and repeat Steps S201, S202, and S206 until the controller 102 determines that the combustion unit 103 is operating, the fuel cell unit 101 is in a stop state, and the activation command of the fuel cell unit 101 is input.

In contrast, when the activation command of the fuel cell unit 101 is input (Yes in Step S206), the controller 102 proceeds to Step S207. In Step S207, the controller 102 activates the oxidizing gas supply unit 15.

At this time, the controller 102 controls the oxidizing gas supply unit 15 such that the flow rate of the second exhaust gas (the flue gas (the combustion fuel and the combustion air)) discharged from the combustion unit 103 (the combustion fuel supply unit and the combustion fan 18) becomes constant. That is, the controller 102 controls the rate of change of the flow rate of the first exhaust gas (herein, the off oxidizing gas) discharged from the fuel cell unit 101 (herein, the oxidizing gas supply unit 15).

For example, the controller 102 may control the oxidizing gas supply unit 15 such that the rate of change of the flow rate of the off oxidizing gas discharged from the oxidizing gas supply unit 15 to the discharge passage 70 becomes lower than that in a case where the combustion unit 103 is in a stop state and the controller 102 activates the fuel cell unit 101 (to be precise, the oxidizing gas supply unit 15). Moreover, for example, the controller 102 may control the oxidizing gas supply unit 15 such that the amount of time in which the controller 102 changes the operation amount of the oxidizing gas supply unit 15 becomes larger than that in a case where the combustion unit 103 is in a stop state and the controller 102 activates the fuel cell unit 101 (to be precise, the oxidizing gas supply unit 15).

Next, the controller 102 causes the fuel gas supply unit 14 to supply the fuel gas to the fuel cell 11 (Step S208). With this, in the fuel cell 11, the supplied fuel gas and oxidizing gas electrically react with each other to generate electricity and heat. The off fuel gas and off oxidizing gas unconsumed in the fuel cell 11 flow through the discharge passage 70 to be discharged to the outside of the building 200.

Here, the exhaust gas flow rate control operation performed in a case where the combustion unit 103 is operating, the fuel cell unit 101 is in a stop state, and the controller 102 activates the fuel cell unit 101 will be more specifically explained in reference to FIG. 5B.

As shown in FIG. 5B, the combustion unit 103 is operating at a steady state, and the fuel cell unit 101 is in a stop state (Yes in Step S201 and No in Step S202 in FIG. 4). Then, the activation command of the fuel cell unit 101 is input to the controller 102 (Yes in Step S206 in FIG. 4).

Then, the controller 102 gradually increases the operation amount of the oxidizing gas supply unit 15 to activate the oxidizing gas supply unit 15. By gradually increasing the operation amount of the oxidizing gas supply unit 15, the pressure loss of the discharge passage 70 gradually increases. Therefore, the flow rate of the second exhaust gas (flue gas) discharged from the combustor 17 to the discharge passage 70 gradually decreases. With this, the flow rate of the second exhaust gas (the combustion fuel and the combustion air) discharged from the combustion fuel supply unit and the combustion fan 18 to the discharge passage 70 just gradually decreases. On this account, the deviation of the air-fuel ratio in the combustion unit 103 can be suppressed to a small extent, and the change of the combustion state in the combustion unit 103 (the combustor 17) also becomes slight. Thus, in the power generation system 100 according to Embodiment 1, the combustion unit 103 can be stably operated.

For example, the controller 102 may change the operation amount of the oxidizing gas supply unit 15 up to the target operation amount by using a longer time than a case where the combustion unit 103 is in a stop state and the controller 102 activates the oxidizing gas supply unit 15 (chain double-dashed line in FIG. 5B). With this, the rate of change of the flow rate of the first exhaust gas (the off oxidizing gas) discharged from the oxidizing gas supply unit 15 to the discharge passage 70 can be made lower than that in a case where the combustion unit 103 is in a stop state and the controller 102 activates the oxidizing gas supply unit 15.

As above, in the power generation system 100 according to Embodiment 1, in a case where the exhaust gas is being discharged to the discharge passage 70 from one of the fuel cell unit 101 and the combustion unit 103 and the controller 102 changes the flow rate of the exhaust gas discharged from the other unit, the controller 102 controls the other unit (to be more precise, controls the rate of change of the flow rate of the exhaust gas discharged from the other unit) such that the flow rate of the exhaust gas discharged from the one unit becomes constant. Thus, the power generation system 100 can be stably operated.

In Embodiment 1, the discharge passage 70, the off fuel gas passage 73, the off oxidizing gas passage 74, and the exhaust gas passage 77 are formed separately. However, the present embodiment is not limited to this. These passages may be regarded as one discharge passage 70.

In Embodiment 1, as a case where the controller changes the flow rate of the exhaust gas discharged from the other unit, the case where the controller activates the other unit that is in a stop state and the case where the controller stops the other unit that is operating are exemplified. However, the present embodiment is not limited to this. For example, the case where the controller changes (increases or decreases) the operation amount of the other unit that is operating may be adopted.

In Embodiment 1, the controller 102 rapidly stops the combustion fuel supply unit in a case where the fuel cell unit 101 and the combustion unit 103 are operating and the controller 102 stops the combustion unit 103. However, the present embodiment is not limited to this. As with the combustion fan 18, the controller 102 may gradually stop the combustion fuel supply unit (over time). Further, in a case where the fuel cell unit 101 and the combustion unit 103 are operating and the controller 102 stops the combustion unit 103, the controller 102 stops the combustion fuel supply unit, and then, stops the combustion fan 18. However, the present embodiment is not limited to this. The controller 102 may stop the combustion fuel supply unit and the combustion fan 18 at the same time.

In Embodiment 1, the controller 102 rapidly activates the combustion fuel supply unit in a case where the fuel cell unit 101 is operating, the combustion unit 103 is in a stop state, and the controller 102 activates the combustion unit 103. However, the present embodiment is not limited to this. As with the combustion fan 18, the controller 102 may gradually activate the combustion fuel supply unit (over time). Further, in a case where the fuel cell unit 101 is operating and the combustion unit 103 is in a stop state and the controller 102 activates the combustion unit 103, the controller 102 activates the combustion fan 18, and then, activates the combustion fuel supply unit. However, the present embodiment is not limited to this. The controller 102 may activate the combustion fuel supply unit and the combustion fan 18 at the same time.

In Embodiment 1, the controller 102 rapidly stops the fuel gas supply unit 14 in a case where the combustion unit 103 and the fuel cell unit 101 are operating and the controller 102 stops the fuel cell unit 101. However, the present embodiment is not limited to this. As with the oxidizing gas supply unit 15, the controller 102 may gradually stop the fuel gas supply unit 14 (over time). Further, in a case where the combustion unit 103 and the fuel cell unit 101 are operating and the controller 102 stops the fuel cell unit 101, the controller 102 stops the fuel gas supply unit 14, and then, stops the oxidizing gas supply unit 15. However, the present embodiment is not limited to this. The controller 102 may stop the fuel gas supply unit 14 and the oxidizing gas supply unit 15 at the same time.

In Embodiment 1, the controller 102 rapidly activates the fuel gas supply unit 14 in a case where the combustion unit 103 is operating, the fuel cell unit 101 is in a stop state, and the controller 102 activates the fuel cell unit 101. However, the present embodiment is not limited to this. As with the oxidizing gas supply unit 15, the controller 102 may gradually activate the fuel gas supply unit 14 (over time). Further, in a case where the combustion unit 103 is operating and the fuel cell unit 101 is in a stop state and the controller 102 activates the fuel cell unit 101, the controller 102 activates the oxidizing gas supply unit 15, and then, activates the fuel gas supply unit 14. However, the present embodiment is not limited to this. The controller 102 may activate the fuel gas supply unit 14 and the oxidizing gas supply unit 15 at the same time.

Embodiment 2

In the power generation system according to Embodiment 2 of the present invention, in a case where the exhaust gas is being discharged to the discharge passage from one of the units and the controller changes the flow rate of the exhaust gas discharged from the other unit, the controller controls the one unit and the other unit such that the flow rate of the exhaust gas discharged from the one unit becomes constant.

Since the power generation system 100 according to Embodiment 2 of the present invention is the same in basic configuration as the power generation system 100 according to Embodiment 1, a detailed explanation of the configuration thereof is omitted.

Operations of Power Generation System

First, operations performed in a case where the fuel cell unit 101 is operating and the controller 102 changes the flow rate of the exhaust gas discharged from the combustion unit 103 will be explained in reference to FIGS. 6, 7A, and 7B.

Figure 6:
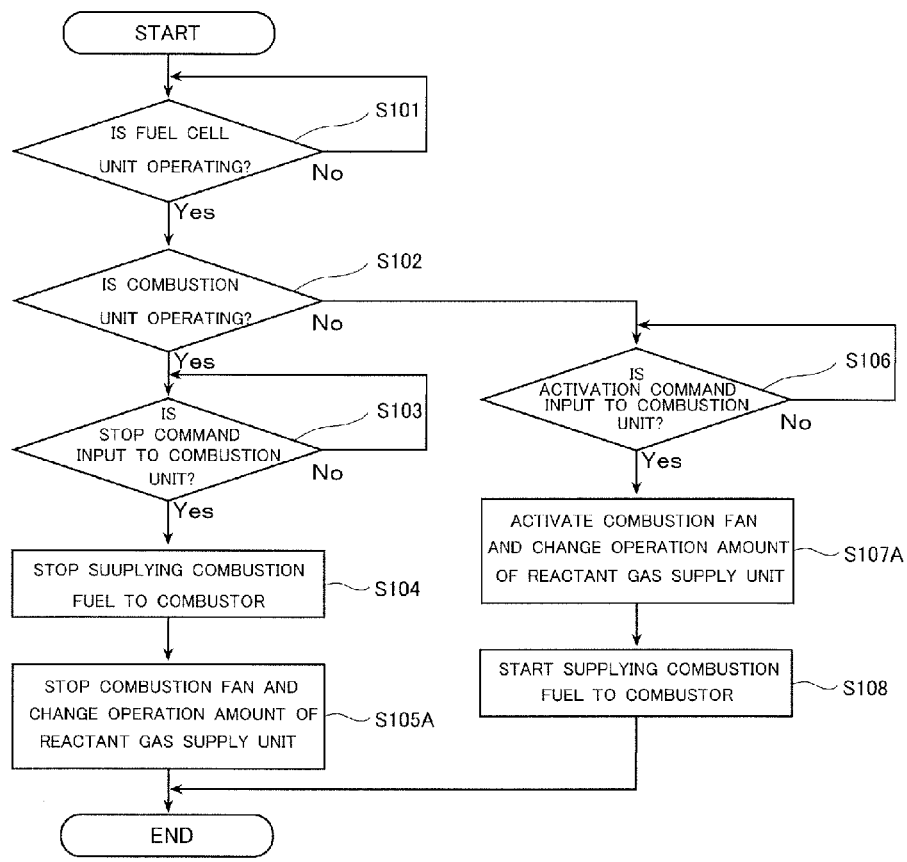
FIG. 6 is a flow chart schematically showing the exhaust gas flow rate control operation of the power generation system according to Embodiment 2.

FIG. 6 is a flow chart schematically showing the exhaust gas flow rate control operation of the power generation system according to Embodiment 2. FIG. 7A is a time chart showing the operations of the major components constituting the power generation system in Steps S103 to S105A in the flow chart shown in FIG. 6. FIG. 7B is a time chart showing the operations of the major components constituting the power generation system in Steps S106 to S108 in the flow chart shown in FIG. 6.

As shown in FIG. 6, the exhaust gas flow rate control operation of the power generation system 100 according to Embodiment 2 is basically the same as that of the power generation system 100 according to Embodiment 1 shown in FIG. 2 but is different from that of the power generation system 100 according to Embodiment 1 shown in FIG. 2 in that Step S105A is performed instead of Step S105 of FIG. 2, and Step S107A is performed instead of Step S107 of FIG. 2. Hereinafter, the exhaust gas flow rate control operation of the power generation system 100 according to Embodiment 2 will be specifically explained in reference to FIGS. 7A and 7B.

Figure 7A:
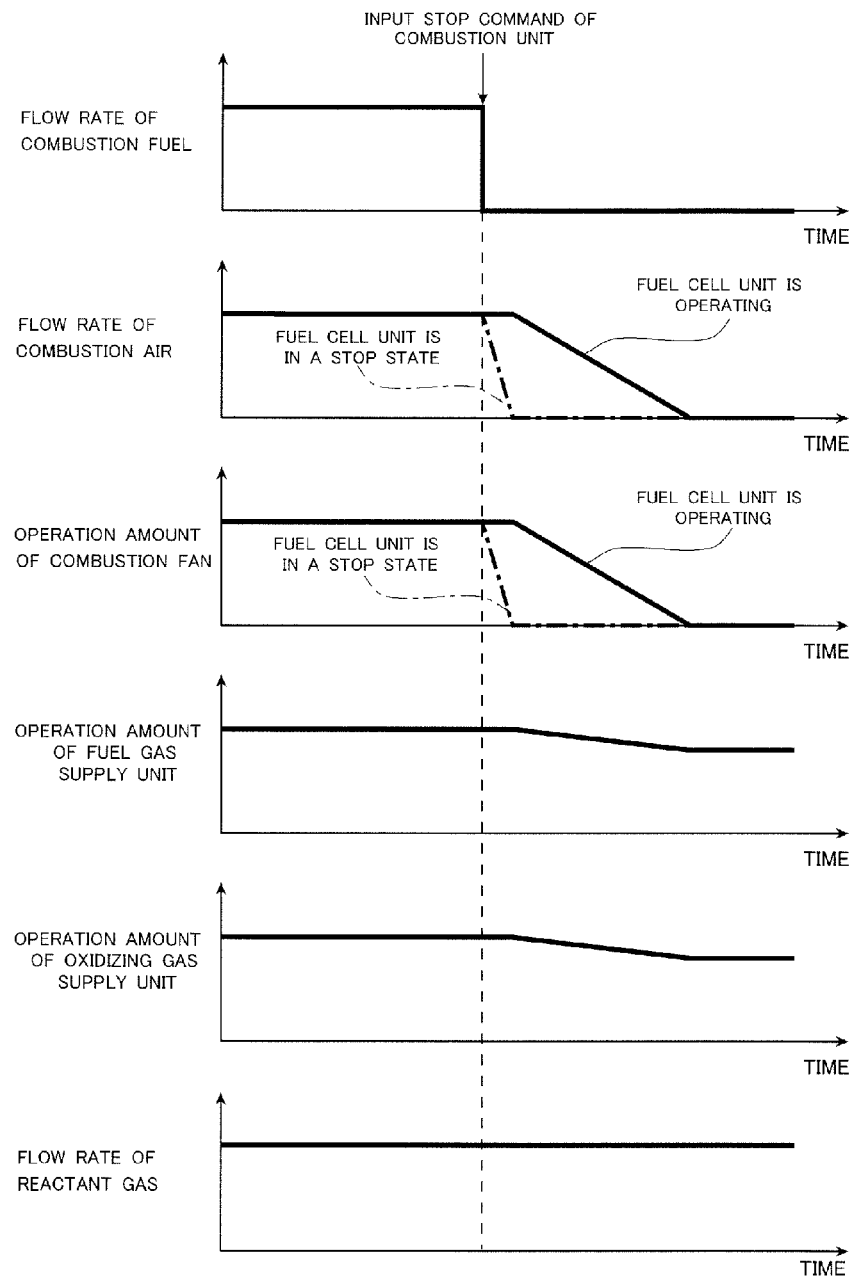
FIG. 7A is a time chart showing the operations of the major components constituting the power generation system in Steps S103 to S105A in the flow chart shown in FIG. 6.

As shown in FIG. 7A, each of the fuel cell unit 101 and the combustion unit 103 is operating at a steady state (Yes in each of Steps S101 and S102 in FIG. 6). Then, when the stop command of the combustion unit 103 is input to the controller 102 (Yes in Step S103 in FIG. 6), the controller 102 stops the combustion fuel supply unit, not shown (Step S104 in FIG. 6).

Next, the controller 102 gradually decreases the operation amount of the combustion fan 18 to stop the combustion fan 18 and changes the operation amount of the fuel gas supply unit 14 and the operation amount of the oxidizing gas supply unit 15 (Step S105A in FIG. 6). With this, the flow rate of the first exhaust gas (herein, the off fuel gas and the off oxidizing gas) discharged from the fuel cell unit 101 (herein, the fuel gas supply unit 14 and the oxidizing gas supply unit 15) to the discharge passage 70 can be maintained at a predetermined flow rate (target flow rate). On this account, the flow rate of a reactant gas supplied from each of the fuel gas supply unit 14 and the oxidizing gas supply unit 15 to the fuel cell 11 can be maintained at a predetermined flow rate (target flow rate).

By gradually decreasing the operation amount of the combustion fan 18, the pressure loss of the discharge passage 70 gradually decreases. However, in Embodiment 2, the controller 102 gradually decreases the operation amount of the fuel gas supply unit 14 or the oxidizing gas supply unit 15 such that the operation amount of the fuel gas supply unit 14 or the oxidizing gas supply unit 15 follows the decrease in the pressure loss of the discharge passage 70. With this, the flow rate of the first exhaust gas (the off fuel gas or the off oxidizing gas) discharged to the discharge passage 70 can be maintained constant, and therefore, the flow rate of the reactant gas supplied to the fuel cell 11 can be maintained constant. Therefore, the power generation efficiency of the fuel cell 11 changes little. On this account, in the power generation system 100 according to Embodiment 2, the fuel cell unit 101 can be more stably operated.

Moreover, the controller 102 may stop the combustion fan 18 such that the amount of time in which the controller 102 changes the operation amount of the combustion fan 18 becomes larger than that in a case where the fuel cell unit 101 is in a stop state and the controller 102 stops the combustion fan 18 (chain double-dashed line of FIG. 7A) and may change the operation amount of each of the fuel gas supply unit 14 and the oxidizing gas supply unit 15 such that the operation amount of each of the fuel gas supply unit 14 and the oxidizing gas supply unit 15 follows the change in the operation amount of the combustion fan 18.

With this, the rate of change of the flow rate of the second exhaust gas (combustion air) discharged from the combustion fan 18 to the discharge passage 70 can be made lower than that in a case where the fuel cell unit 101 is in a stop state an the controller 102 stops the combustion fan 18.

Figure 7B:
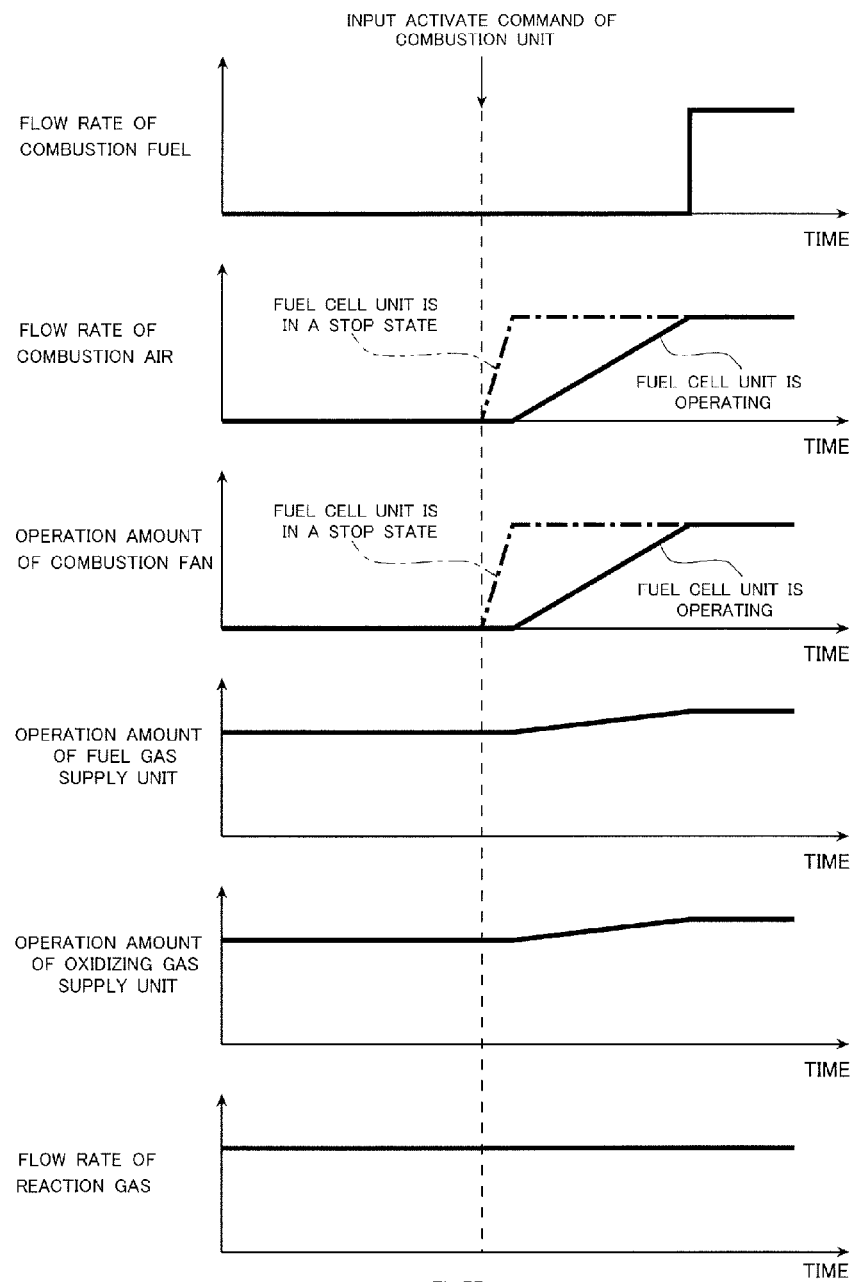
FIG. 7B is a time chart showing the operations of the major components constituting the power generation system in Steps S106 to S108 in the flow chart shown in FIG. 6.

In contrast, as shown in FIG. 7B, the fuel cell unit 101 is operating at a steady state, and the combustion unit 103 is in a stop state (Yes in Step S101 and No in Step S102 in FIG. 6). Then, the activation command of the combustion unit 103 is input to the controller 102 (Yes in Step S106 in FIG. 6).

Then, the controller 102 gradually increases the operation amount of the combustion fan 18 to activate the combustion fan 18 and changes the operation amount of the fuel gas supply unit 14 and the operation amount of the oxidizing gas supply unit 15 (Step S107A in FIG. 6). With this, the flow rate of the first exhaust gas (herein, the off fuel gas and the off oxidizing gas) discharged from the fuel cell unit 101 (herein, the fuel gas supply unit 14 and the oxidizing gas supply unit 15) to the discharge passage 70 can be maintained at a predetermined flow rate (target flow rate). Therefore, the flow rate of the reactant gas supplied from each of the fuel gas supply unit 14 and the oxidizing gas supply unit 15 to the fuel cell 11 can be maintained at a predetermined flow rate (target flow rate).

By gradually increasing the operation amount of the combustion fan 18, the pressure loss of the discharge passage 70 gradually increases. However, in Embodiment 2, the controller 102 gradually increases the operation amount of each of the fuel gas supply unit 14 and the oxidizing gas supply unit 15 such that the operation amount of each of the fuel gas supply unit 14 and the oxidizing gas supply unit 15 follows the increase in the pressure loss of the discharge passage 70. With this, the flow rate of the first exhaust gas (the off fuel gas and the off oxidizing gas) discharged to the discharge passage 70 can be maintained constant, and therefore, the flow rate of the reactant gas supplied to the fuel cell 11 can be maintained constant. Therefore, the power generation efficiency of the fuel cell 11 changes little. On this account, in the power generation system 100 according to Embodiment 2, the fuel cell unit 101 can be more stably operated.

The controller 102 may change the operation amount of the combustion fan 18 up to the target operation amount by using a longer time than a case where the fuel cell unit 101 is in a stop state and the controller 102 activates the combustion fan 18 (chain double-dashed line in FIG. 7B) and may change the operation amount of each of the fuel gas supply unit 14 and the oxidizing gas supply unit 15 such that the operation amount of each of the fuel gas supply unit 14 and the oxidizing gas supply unit 15 follows the change in the operation amount of the combustion fan 18.

With this, the rate of change of the flow rate of the second exhaust gas (combustion air) discharged from the combustion fan 18 to the discharge passage 70 can be made lower than that in a case where the fuel cell unit 101 is in a stop state and the controller 102 activates the combustion fan 18.

After that, the controller 102 causes the combustion fuel supply unit (not shown) to supply the combustion fuel to the combustor 17 (Step S108 in FIG. 6). With this, the combustor 17 combusts the combustion fuel and the combustion air to generate the flue gas. The generated flue gas is discharged from the exhaust gas passage 77 to the discharge passage 70.

Next, operations performed in a case where the combustion unit 103 is operating and the controller 102 changes the flow rate of the exhaust gas discharged from the fuel cell unit 101 will be explained in reference to FIGS. 8, 9A, and 9B.

Figure 8:
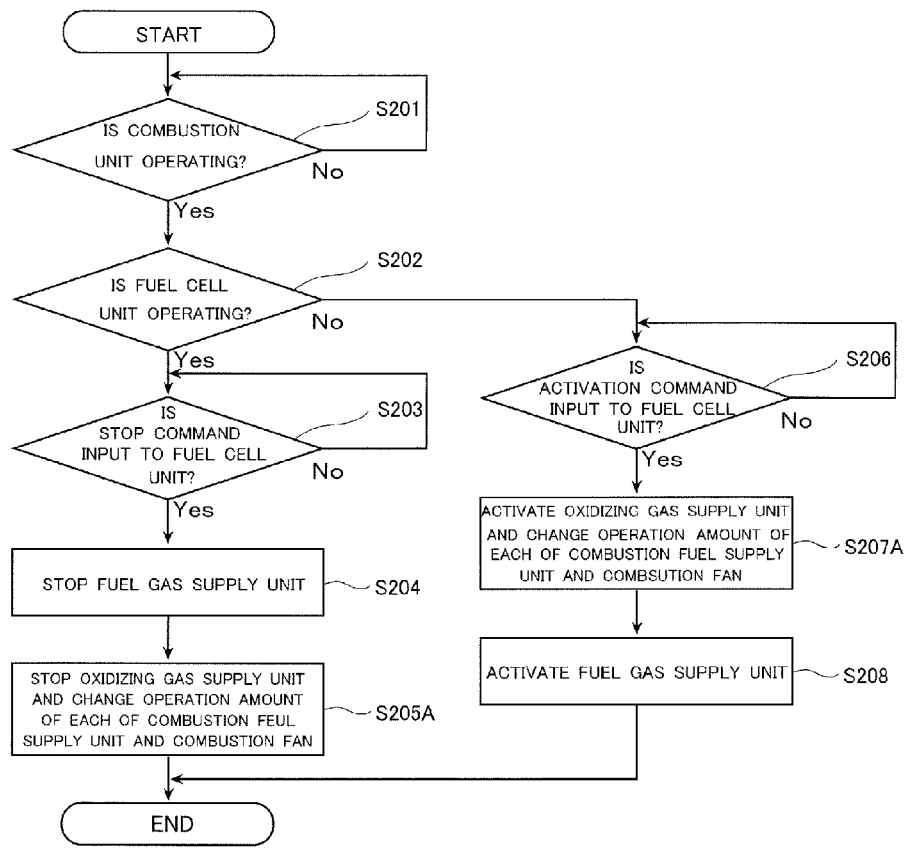
FIG. 8 is a flow chart schematically showing the exhaust gas flow rate control operation of the power generation system according to Embodiment 2.

FIG. 8 is a flow chart schematically showing the exhaust gas flow rate control operation of the power generation system according to Embodiment 2. FIG. 9A is a time chart showing the operations of the major components constituting the power generation system in Steps S203 to S205A in the flow chart shown in FIG. 8. FIG. 9B is a time chart showing the operations of the major components constituting the power generation system in Steps S206 to S208 in the flow chart shown in FIG. 8.

As shown in FIG. 8, the exhaust gas flow rate control operation of the power generation system 100 according to Embodiment 2 is basically the same as that of the power generation system 100 according to Embodiment 1 shown in FIG. 4 but is different from that of the power generation system 100 according to Embodiment 1 shown in FIG. 4 in that: Step S205A is performed instead of Step S205; and Step S207A is performed instead of Step S207. Hereinafter, the exhaust gas flow rate control operation of the power generation system 100 according to Embodiment 2 will be specifically explained in reference to FIG. 9.

Figure 9A:
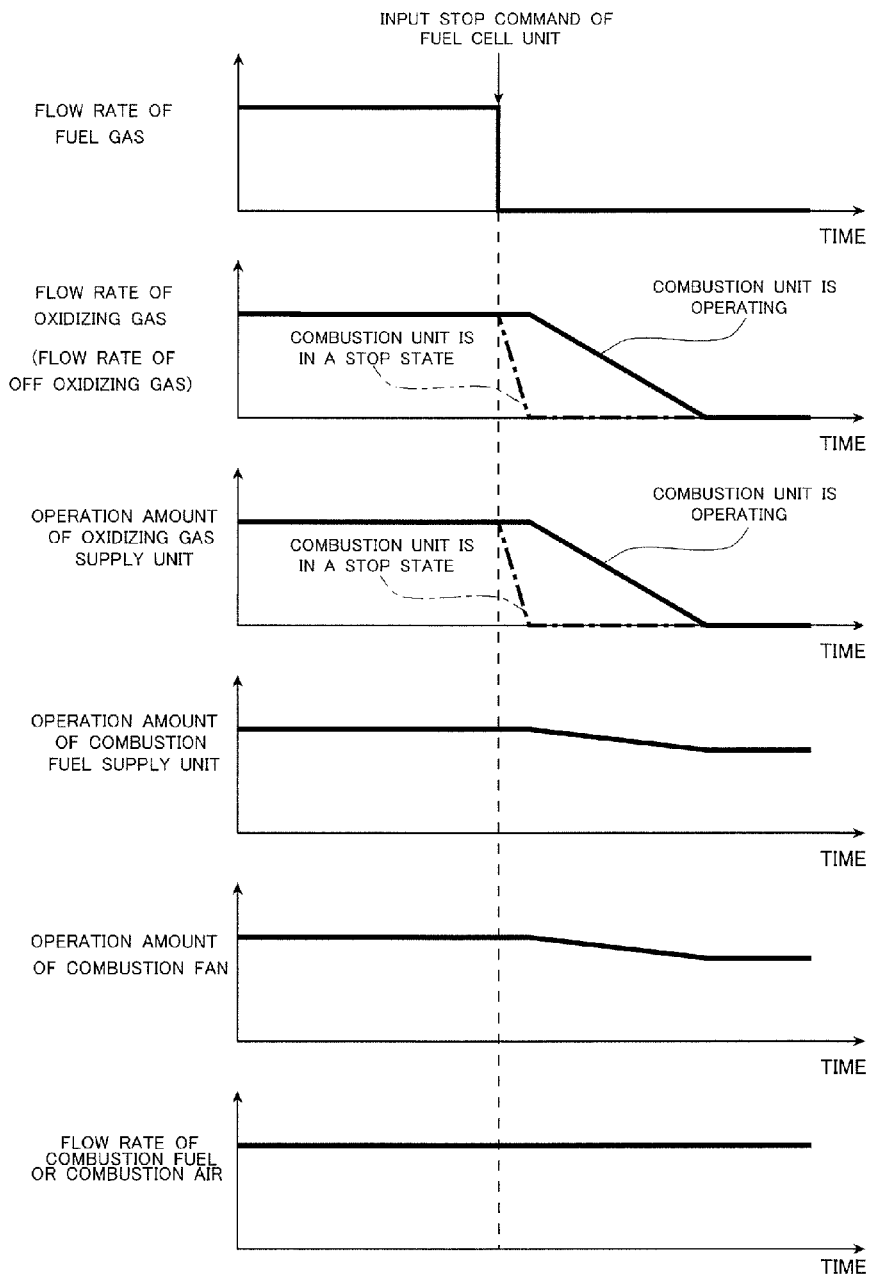
FIG. 9A is a time chart showing the operations of the major components constituting the power generation system in Steps S203 to S205A in the flow chart shown in FIG. 8.

As shown in FIG. 9A, each of the combustion unit 103 and the fuel cell unit 101 is operating at a steady state (Yes in each of Steps S201 and S202 in FIG. 8). Then, when the stop command of the fuel cell unit 101 is input to the controller 102 (Yes in Step S203 in FIG. 9), the controller 102 stops the fuel gas supply unit 14 (Step S204 in FIG. 9).

Next, the controller 102 gradually decreases the operation amount of the oxidizing gas supply unit 15 to stop the oxidizing gas supply unit 15 and changes the operation amount of the combustion fuel supply unit and the operation amount of the combustion fan 18 (Step S205A in FIG. 8). Moreover, the flow rate of the second exhaust gas (the flue gas) discharged from the combustion unit 103 can be maintained at a predetermined flow rate (target flow rate). Therefore, each of the flow rate of the combustion fuel supplied from the combustion fuel supply unit to the combustion unit 103 and the flow rate of the combustion air supplied from the combustion fan 18 to the combustion unit 103 can be maintained at a predetermined flow rate (target flow rate).

By gradually decreasing the operation amount of the oxidizing gas supply unit 15, the pressure loss of the discharge passage 70 gradually decreases. However, in Embodiment 2, the controller 102 gradually decreases the operation amount of each of the combustion fuel supply unit and the combustion fan 18 such that the operation amount of each of the combustion fuel supply unit and the combustion fan 18 follows the decrease in the pressure loss of the discharge passage 70. With this, the flow rate of the second exhaust gas (the flue gas) discharged from the combustion unit 103 to the discharge passage 70 can be maintained constant, and therefore, the flow rate each of the combustion fuel and combustion air supplied to the combustor 17 of the combustion unit 103 can be maintained constant. Therefore, the deviation of the air-fuel ratio of the combustion in the combustion unit 103 (the combustor 17) can be suppressed to a small extent. On this account, in the power generation system 100 according to Embodiment 2, the combustion unit 103 can be more stably operated.

The controller 102 may stop the oxidizing gas supply unit 15 such that the amount of time in which the controller 102 changes the operation amount of the oxidizing gas supply unit 15 becomes larger than that in a case where the combustion unit 103 is in a stop state and the controller 102 stops the oxidizing gas supply unit 15 (chain double-dashed line in FIG. 9A) and may change the operation amount of each of the combustion fuel supply unit and the combustion fan 18 such that the operation amount of each of the combustion fuel supply unit and the combustion fan 18 follows the change in the operation amount of the oxidizing gas supply unit 15.

With this, the rate of change of the flow rate of the first exhaust gas (the off oxidizing gas) discharged from the oxidizing gas supply unit 15 to the discharge passage 70 can be made smaller than that in a case where the combustion unit 103 is in a stop state and the controller 102 stops the oxidizing gas supply unit 15.

Figure 9B:
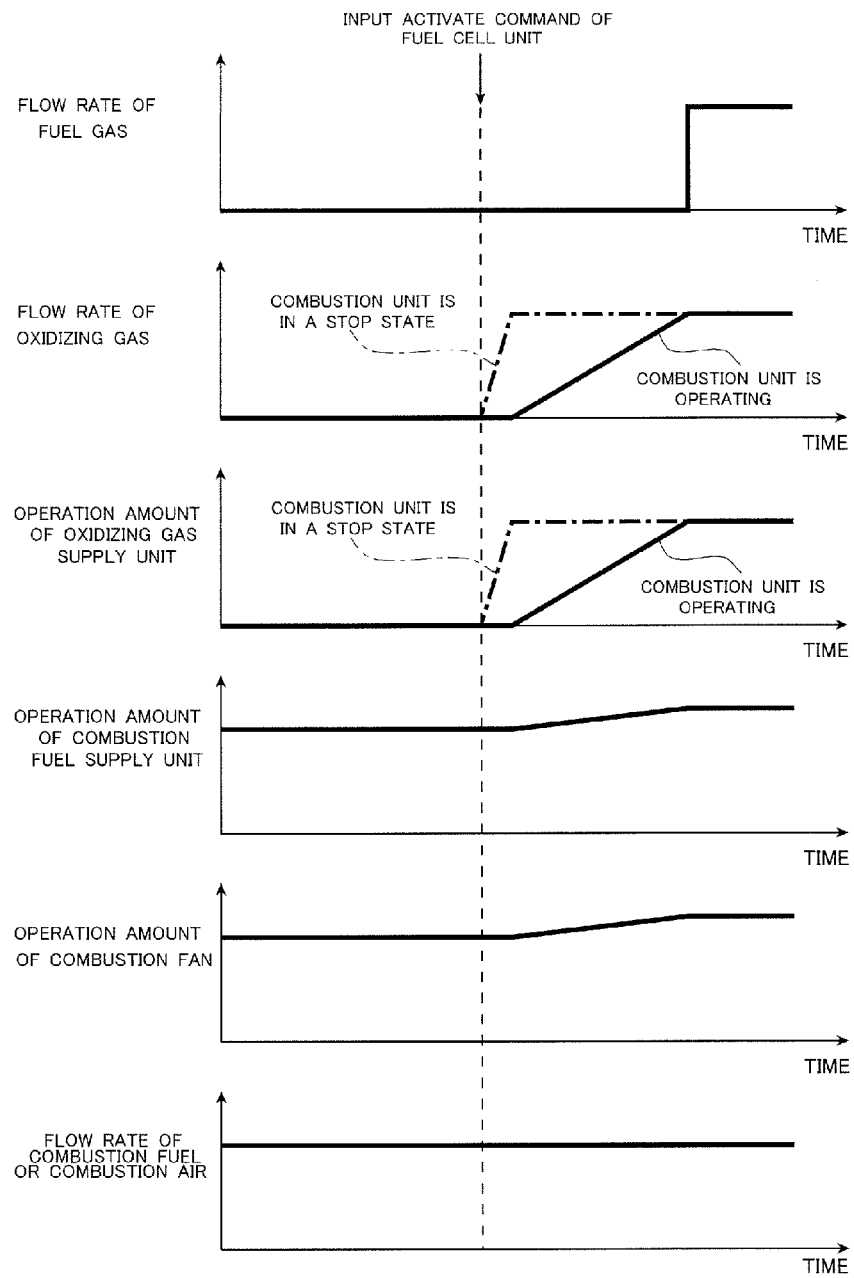
FIG. 9B is a time chart showing the operations of the major components constituting the power generation system in Steps S206 to S208 in the flow chart shown in FIG. 8.

In contrast, as shown in FIG. 9B, the combustion unit 103 is operating at a steady state, and the fuel cell unit 101 is in a stop state (Yes in Step S201 and No in Step S202 in FIG. 8). Then, the activation command of the fuel cell unit 101 is input to the controller 102 (Yes in Step S206 in FIG. 8).

Then, the controller 102 gradually increases the operation amount of the oxidizing gas supply unit 15 to activate the oxidizing gas supply unit 15 and changes the operation amount of the combustion fuel supply unit and the operation amount of the combustion fan 18 (Step S207A). With this, the flow rate of the second exhaust gas (the flue gas) discharged from the combustion unit 103 can be maintained at a predetermined flow rate (target flow rate). Therefore, each of the flow rate of the combustion fuel supplied from the combustion fuel supply unit to the combustion unit 103 and the flow rate of the combustion air supplied from the combustion fan 18 to the combustion unit 103 can be maintained at a predetermined flow rate (target flow rate).

By gradually increasing the operation amount of the oxidizing gas supply unit 15, the pressure loss of the discharge passage 70 gradually increases. However, in Embodiment 2, the controller 102 gradually increases the operation amount of each of the combustion fuel supply unit and the combustion fan 18 such that the operation amount of each of the combustion fuel supply unit and the combustion fan 18 follows the increase in the pressure loss of the discharge passage 70.

With this, the flow rate of the second exhaust gas (the flue gas) discharged from the combustion unit 103 (the combustor 17) to the discharge passage 70 can be maintained constant, and therefore, the flow rate of the second exhaust gas (the combustion fuel or the combustion air) discharged from the combustion fuel supply unit or the combustion fan 18 to the discharge passage 70 can be maintained constant. Therefore, the deviation of the air-fuel ratio of the combustion in the combustion unit 103 (the combustor 17) can be suppressed to a small extent. On this account, in the power generation system 100 according to Embodiment 2, the combustion unit 103 can be more stably operated.

For example, the controller 102 changes the operation amount of the oxidizing gas supply unit 15 up to the target operation amount by using a longer time than that in a case where the combustion unit 103 is in a stop state and the controller 102 activates the oxidizing gas supply unit 15 (chain double-dashed line in FIG. 9B) and changes the operation amount of each of the combustion fuel supply unit and the combustion fan 18 such that the operation amount of each of the combustion fuel supply unit and the combustion fan 18 follows the change in the operation amount of the oxidizing gas supply unit 15.

With this, the rate of change of the flow rate of the first exhaust gas (the off oxidizing gas) discharged from the oxidizing gas supply unit 15 to the discharge passage 70 can be made lower than that in a case where the combustion unit 103 is in a stop state and the controller 102 activates the oxidizing gas supply unit 15.

The power generation system 100 according to Embodiment 2 configured as above also has the same operational advantages as the power generation system 100 according to Embodiment 1. In the power generation system 100 according to Embodiment 2, the change in the flow rate of the exhaust gas discharged from one of the units can be made lower by changing the operation amount of the one unit in accordance with the change in the operation amount of the other unit. Thus, the power generation system 100 can be more stably operated.

In Embodiment 2, the amount of time in which the controller changes the operation amount of the other unit is equal to the amount of time in which the controller changes the operation amount of the one unit. However, the present embodiment is not limited to this. The amount of time in which the controller changes the operation amount of the other unit may be equal to or larger than the amount of time in which the controller changes the operation amount of the one unit.

Embodiment 3

The power generation system according to Embodiment 3 of the present invention is configured such that the fuel cell system further includes a hydrogen generator including a reformer configured to generate a hydrogen-containing gas from a raw material and steam and a combustor configured to heat the reformer.

Configuration of Power Generation System

Figure 10:
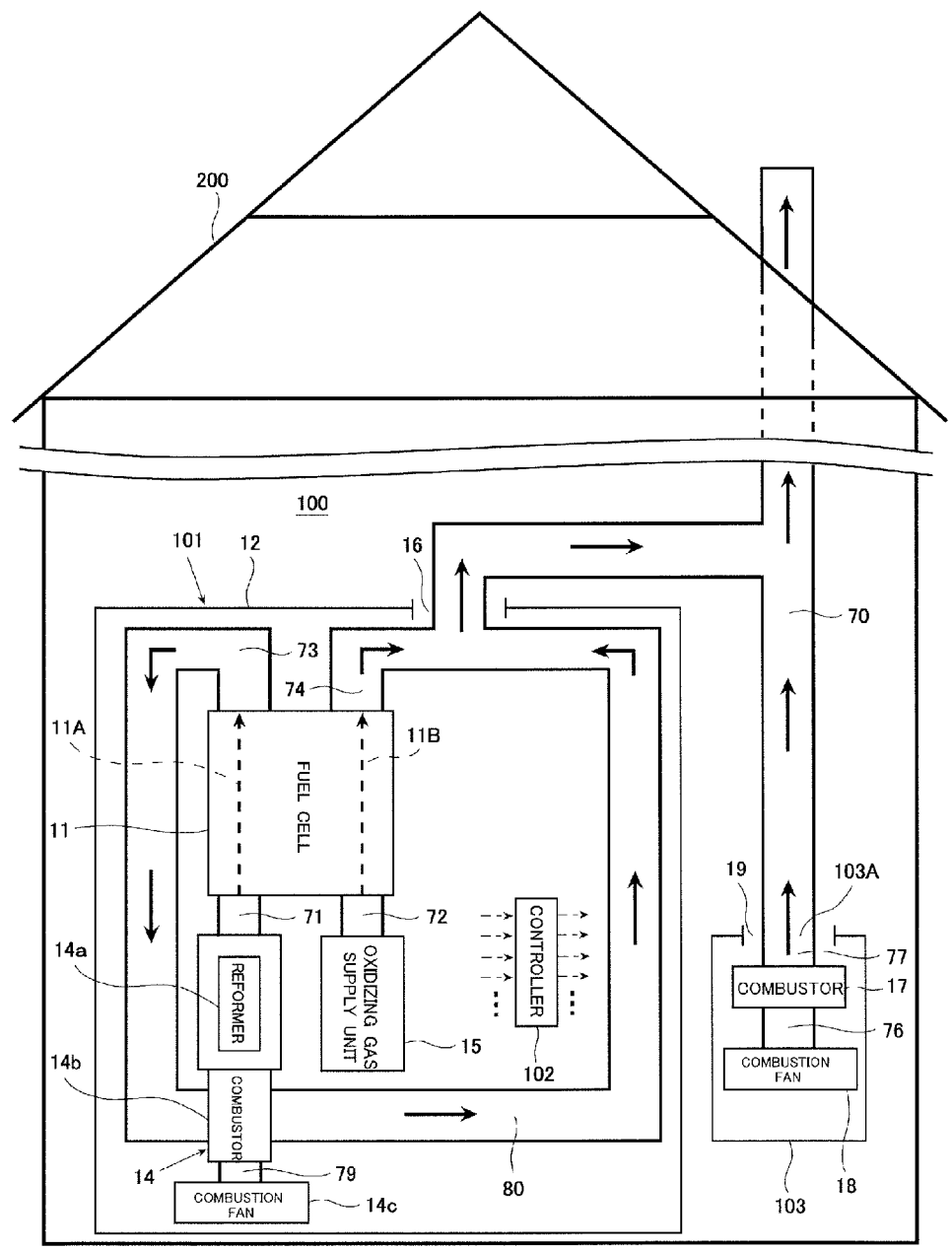
FIG. 10 is a schematic diagram showing the schematic configuration of the power generation system according to Embodiment 3 of the present invention.

FIG. 10 is a schematic diagram showing the schematic configuration of the power generation system according to Embodiment 3 of the present invention.

As shown in FIG. 10, the power generation system 100 according to Embodiment 3 of the present invention is the same in basic configuration as the power generation system 100 according to Embodiment 1 but is different from the power generation system 100 according to Embodiment 1 in that: the fuel gas supply unit 14 is constituted by a hydrogen generator 14; and the off fuel gas passage 73 is connected to the combustor 14b of the hydrogen generator 14. Specifically, the hydrogen generator 14 includes the reformer 14a and the combustor 14b.

The downstream end of the off fuel gas passage 73 is connected to the combustor 14b. The off fuel gas flows from the fuel cell 11 through the off fuel gas passage 73 to be supplied to the combustor 14b as the combustion fuel. A combustion fan 14c is connected to the combustor 14b through an air supply passage 79. The combustion fan 14c may have any configuration as long as it can supply the combustion air to the combustor 14b. For example, the combustion fan 14c may be constituted by a fan, a blower, or the like. In the power generation system of Embodiment 3, the supply of the combustion air to the combustor is realized by the combustion fan. However, the oxidizing gas supply unit may be used. The power generation system of Embodiment 3 may be configured such that: a passage connecting the oxidizing gas supply passage and the combustor is formed; and the oxidizing gas (oxygen) supplied from the oxidizing gas supply unit is supplied to the combustor and the fuel cell.

The combustor 14b combusts the supplied off fuel gas and combustion air to generate the flue gas and heat. The flue gas generated in the combustor 14b heats the reformer 14a and the like, and then, is discharged to a flue gas passage 80. The flue gas discharged to the flue gas passage 80 flows through the flue gas passage 80 to be discharged to the discharge passage 70. The flue gas discharged to the discharge passage 70 flows through the discharge passage 70 to be discharged to the outside of the power generation system 100 (the building 200).

A raw material supply unit and a water supply unit (both not shown) are connected to the reformer 14a, and the raw material and the water are supplied to the reformer 14a. Examples of the raw material are a natural gas containing methane as a major component and a LP gas.

The reformer 14a includes a reforming catalyst. The reforming catalyst may be any material as long as, for example, it can serve as a catalyst in a steam-reforming reaction by which the hydrogen-containing gas is generated from the raw material and the water (steam). Examples of the reforming catalyst are a ruthenium-based catalyst in which a catalyst carrier, such as alumina, supports ruthenium (Ru) and a nickel-based catalyst in which the same catalyst carrier as above supports nickel (Ni).

In the reformer 14a, the hydrogen-containing gas is generated by the reforming reaction between the supplied raw material and steam. The generated hydrogen-containing gas flows as the fuel gas through the fuel gas supply passage 71 to be supplied to the fuel gas channel 11A of the fuel cell 11.

Embodiment 3 is configured such that the hydrogen-containing gas generated in the reformer 14a is supplied as the fuel gas to the fuel cell 11. However, the present embodiment is not limited to this. Embodiment 3 may be configured such that the hydrogen-containing gas flowed through a shift converter or carbon monoxide remover provided in the hydrogen generator 14 is supplied to the fuel cell 11, the shift converter including a shift catalyst (such as a copper-zinc-based catalyst) for reducing carbon monoxide in the hydrogen-containing gas supplied from the reformer 14a, the carbon monoxide remover including an oxidation catalyst (such as a ruthenium-based catalyst) or a methanation catalyst (such as a ruthenium-based catalyst).

Operations of Power Generation System

Next, the operations of the power generation system 100 according to Embodiment 3 will be explained in reference to FIGS. 10 to 12B. Specifically, operations performed in a case where the combustion unit 103 is operating and the controller 102 changes the flow rate of the exhaust gas discharged from the fuel cell unit 101 will be explained. Since operations performed in a case where the fuel cell unit 101 is operating and the controller 102 changes the flow rate of the exhaust gas discharged from the combustion unit 103 in the power generation system 100 according to Embodiment 3 are the same as those in the power generation system 100 according to each of Embodiments 1 and 2, detailed explanations thereof are omitted.

Figure 11:
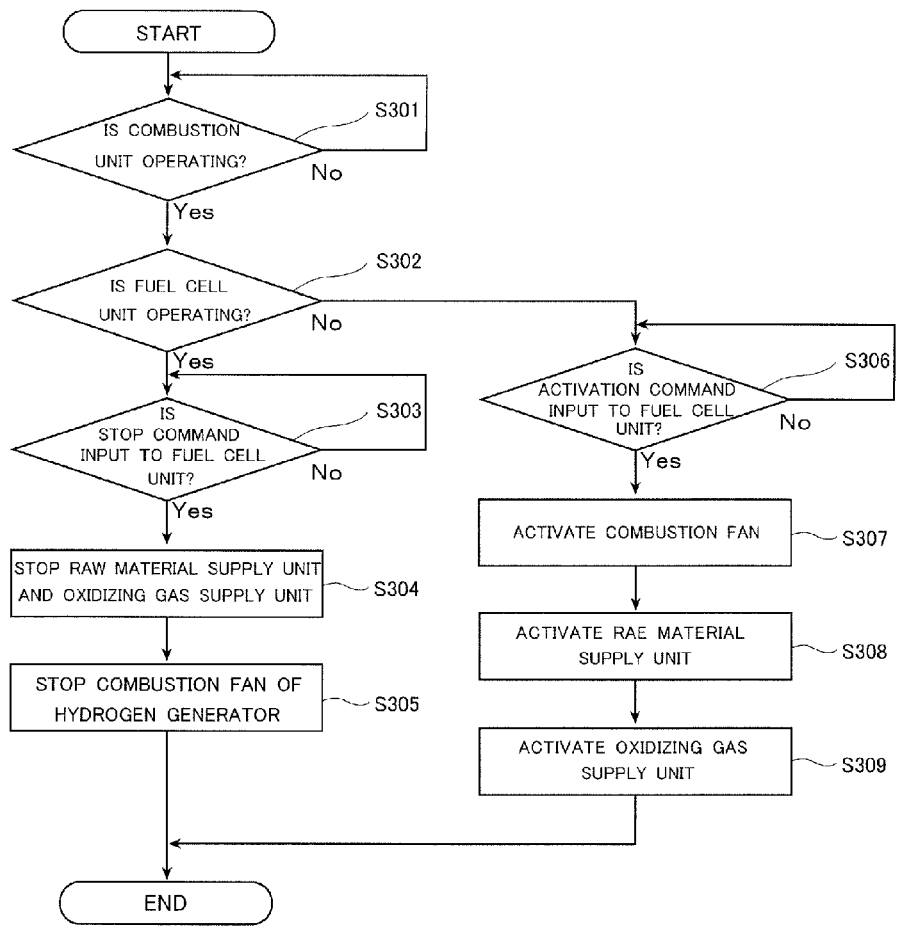
FIG. 11 is a flow chart schematically showing the exhaust gas flow rate control operation of the power generation system according to Embodiment 3.
Figure 12A:
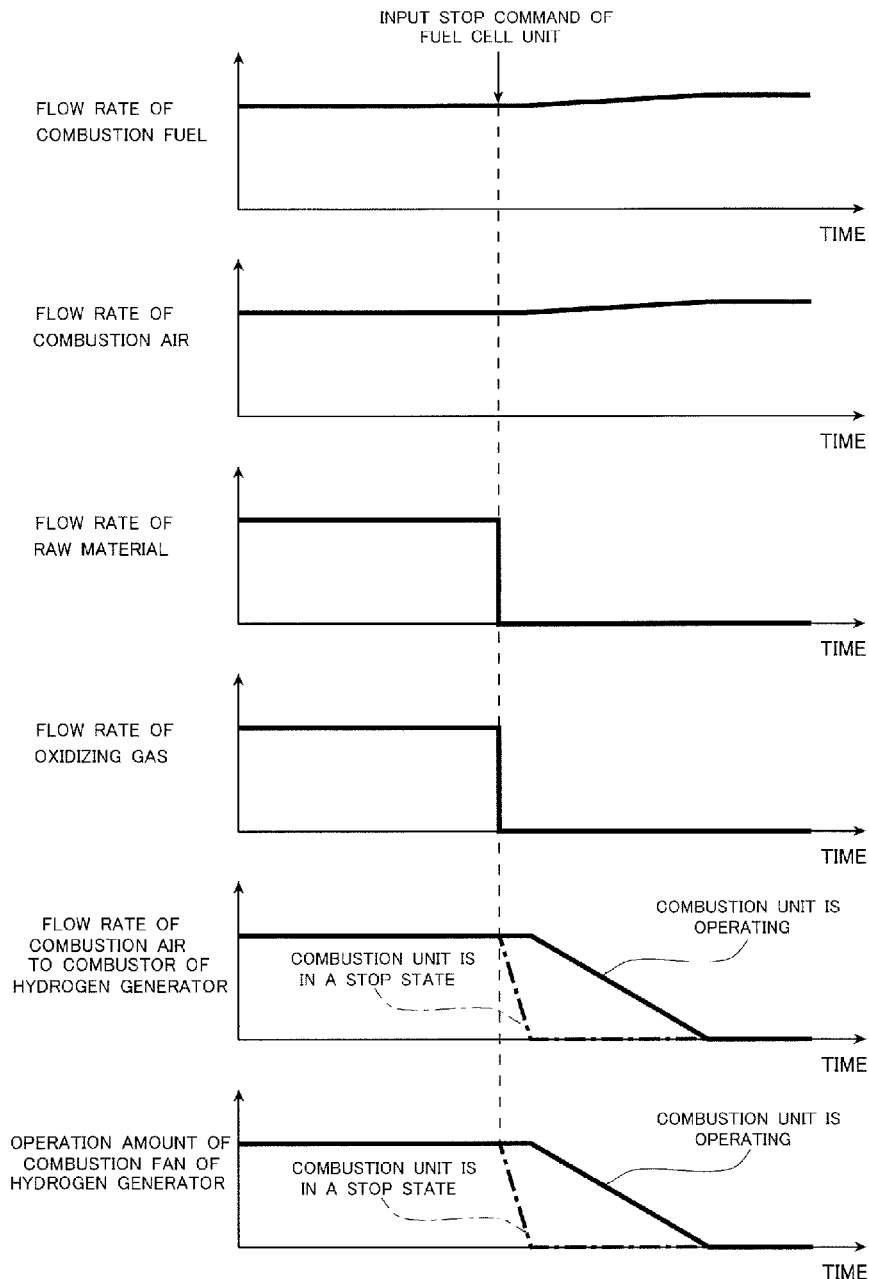
FIG. 12A is a time chart showing the operations of the major components constituting the power generation system in Steps S303 to S305 in the flow chart shown in FIG. 11.
Figure 12B:
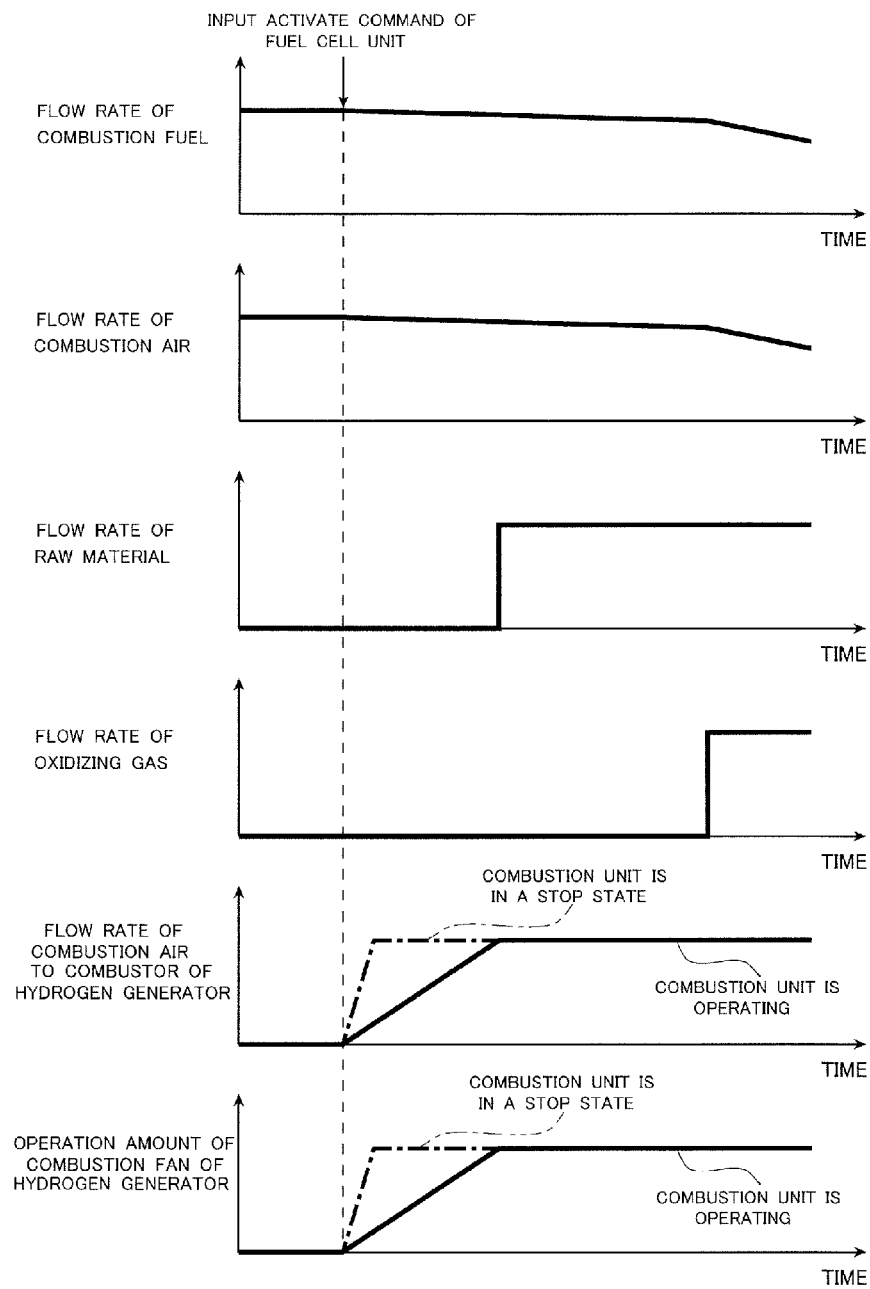
FIG. 12B is a time chart showing the operations of the major components constituting the power generation system in Steps S306 to S309 in the flow chart shown in FIG. 11.

FIG. 11 is a flow chart schematically showing the exhaust gas flow rate control operation of the power generation system according to Embodiment 3. FIG. 12A is a time chart showing the operations of the major components constituting the power generation system in Steps S303 to S305 in the flow chart shown in FIG. 11. FIG. 12B is a time chart showing the operations of the major components constituting the power generation system in Steps S306 to S309 in the flow chart shown in FIG. 11.

As shown in FIG. 11, the controller 102 confirms whether or not the combustion unit 103 is operating (Step S301). When the combustion unit 103 is not operating (No in Step S301), the controller 102 repeats Step S301 until the controller 102 confirms that the combustion unit 103 is operating. In contrast, when the combustion unit 103 is operating (Yes in Step S301), the controller 102 proceeds to Step S302.

In Step S302, the controller 102 determines whether or not the fuel cell unit 101 is operating. When the fuel cell unit 101 is in a stop state (No in Step S302), the controller 102 proceeds to Step S306. In contrast, when the fuel cell unit 101 is operating (Yes in Step S302), the controller 102 proceeds to Step S303.

In Step S303, the controller 102 confirms whether or not the stop command is input to the fuel cell unit 101. Examples of a case where the stop command of the fuel cell unit 101 is input are a case where the user of the power generation system 100 operates a remote controller, not shown, to instruct the stop of the fuel cell unit 101 and a case where the preset operation stop time of the fuel cell unit 101 has come.

When the stop command of the fuel cell unit 101 is not input (No in Step S303), the controller 102 repeats Step S303 until the stop command of the fuel cell unit 101 is input. In this case, the controller 102 may return to Step S301 and repeat Steps S301 to S303 until the controller 102 confirms that the combustion unit 103 and the fuel cell unit 101 are operating and the stop command of the fuel cell unit 101 is input. Moreover, in this case, the controller 102 may return to Step S302 and repeat Steps S302 and S303 until the controller 102 confirms that the fuel cell unit 101 is operating and the stop command of the fuel cell unit 101 is input.

In contrast, when the stop command of the fuel cell unit 101 is input (Yes in Step S303), the controller 102 proceeds to Step S304. In Step S304, the controller 102 stops the supply of the raw material from the raw material supply unit (not shown in FIG. 10) to the reformer 14a of the hydrogen generator 14 and stops the oxidizing gas supply unit 15 (see FIG. 12A). With this, the reformer 14a stops the generation of the hydrogen-containing gas and stops the supply of the fuel gas to the fuel gas channel 11A of the fuel cell 11. In addition, the supply of the oxidizing gas from the oxidizing gas supply unit 15 to the oxidizing gas channel 11B of the fuel cell 11 stops. Then, the electric power generation of the fuel cell 11 stops.

Next, the controller 102 stops the combustion fan 14c of the hydrogen generator 14 (Step S305). At this time, the controller 102 controls the combustion fan 14c such that the flow rate of the second exhaust gas (herein, the flue gas) discharged from the combustion unit 103 becomes constant. That is, the controller 102 controls the rate of change of the flow rate of the first exhaust gas (herein, the combustion air) discharged from the fuel cell unit 101 (herein, the combustion fan 14c).

For example, the controller 102 may control the combustion fan 14c such that the rate of change of the flow rate of the combustion air discharged from the combustion fan 14c through the combustor 14b and the flue gas passage 80 to the discharge passage 70 becomes lower than that in a case where the combustion unit 103 is in a stop state and the controller 102 stops the fuel cell unit 101 (to be precise, the combustion fan 14c). Moreover, for example, the controller 102 may control the combustion fan 14c such that the amount of time in which the controller 102 changes the operation amount of the combustion fan 14c becomes larger than that in a case where the combustion unit 103 is in a stop state and the controller 102 stops the fuel cell unit 101 (to be precise, the combustion fan 14c).

Here, the exhaust gas flow rate control operation performed in a case where the combustion unit 103 and the fuel cell unit 101 are operating and the controller 102 stops the fuel cell unit 101 will be more specifically explained in reference to FIG. 12A.

As shown in FIG. 12A, each of the combustion unit 103 and the fuel cell unit 101 is operating at a steady state (Yes in Steps S301 and S302 in FIG. 11). When the stop command of the fuel cell unit 101 is input to the controller 102 (Yes in Step S303 in FIG. 11), the controller 102 stops the raw material supply unit and the oxidizing gas supply unit 15 (Step S304 in FIG. 11).

Next, the controller 102 gradually decreases the operation amount of the combustion fan 14c to stop the combustion fan 14c (Step S305 in FIG. 11). By gradually decreasing the operation amount of the combustion fan 14c, the pressure loss of the discharge passage 70 gradually decreases. Therefore, the flow rate of the second exhaust gas (the flue gas) discharged from the combustion unit 103 to the discharge passage 70 gradually increases. With this, the flow rate of the combustion fuel supplied from the combustion fuel supply unit (not shown) to the combustor 17 and the flow rate of the combustion air supplied from the combustion fan 18 to the combustor 17 just gradually increase. Therefore, the deviation of the air-fuel ratio of the combustion in the combustion unit 103 (the combustor 17) can be suppressed to a small extent. On this account, in the power generation system 100 according to Embodiment 3, the combustion unit 103 can be stably operated.

Moreover, the controller 102 may stop the combustion fan 14c such that the amount of time in which the controller 102 changes the operation amount of the combustion fan 14c becomes larger than that in a case where the combustion unit 103 is in a stop state and the controller 102 stops the combustion fan 14c (chain double-dashed line in FIG. 12A). With this, the rate of change of the flow rate of the first exhaust gas (the combustion air) discharged from the combustion fan 14c to the discharge passage 70 can be made lower than that in a case where the combustion unit 103 is in a stop state and the controller 102 stops the combustion fan 14c.

In Embodiment 3, in Step S304 in FIG. 11, the controller 102 rapidly stops the oxidizing gas supply unit 15. However, the present embodiment is not limited to this. As with Embodiments 1 and 2, the controller 102 may gradually stop the oxidizing gas supply unit 15 (over time). In this case, it is preferable that the controller 102 stop the oxidizing gas supply unit 15, and then, gradually stop the combustion fan 14c.

In Embodiment 3, the controller 102 stops the raw material supply unit and the oxidizing gas supply unit 15 at the same time. However, the present embodiment is not limited to this. For example, the controller 102 may gradually stop the oxidizing gas supply unit 15 (over time), and then, stop the raw material supply unit. In this case, it is preferable that the controller 102 stop the oxidizing gas supply unit 15, and then, gradually stop the combustion fan 14c.

In contrast, in FIG. 11, when the fuel cell unit 101 is in a stop state (No in Step S302), the controller 102 proceeds to Step S306. In Step S306, the controller 102 confirms whether or not the activation command of the fuel cell unit 101 is input. Examples of a case where the activation command of the fuel cell unit 101 is input are a case where the user of the power generation system 100 operates a remote controller, not shown, to instruct the activation of the fuel cell unit 101 and a case where the preset operation start time of the fuel cell unit 101 has come.

When the activation command of the fuel cell unit 101 is not input (No in Step S306), the controller 102 repeats Step S306 until the activation command of the fuel cell unit 101 is input. In this case, the controller 102 may return to Step S301 and repeat Steps S301, S302, and S306 until the controller 102 confirms that the combustion unit 103 is operating, the fuel cell unit 101 is in a stop state, and the activation command of the fuel cell unit 101 is input.

In contrast, when the activation command of the fuel cell unit 101 is input (Yes in Step S306), the controller 102 proceeds to Step S307. In Step S307, the controller 102 activates the combustion fan 14c. At this time, the controller 102 controls the combustion fan 14c such that the flow rate of the second exhaust gas (the flue gas (the combustion fuel and the combustion air)) discharged from the combustion unit 103 (the combustion fuel supply unit and the combustion fan 18) becomes constant. That is, the controller 102 controls the rate of change of the flow rate of the first exhaust gas (herein, the combustion air) discharged from the fuel cell unit 101 (herein, the combustion fan 14c).

For example, the controller 102 may control the combustion fan 14c such that the rate of change of the flow rate of the combustion air discharged from the combustion fan 14c to the discharge passage 70 becomes lower than that in a case where the combustion unit 103 is in a stop state and the controller 102 activates the fuel cell unit 101 (to be precise, the combustion fan 14c). Moreover, for example, the controller 102 may control the combustion fan 14c such that the amount of time in which the controller 102 changes the operation amount of the combustion fan 14c becomes larger than that in a case where the combustion unit 103 is in a stop state and the controller 102 activates the fuel cell unit 101 (to be precise, the combustion fan 14c).

Next, the controller 102 activates the raw material supply unit (not shown in FIG. 10) to start supplying the raw material to the reformer 14a of the hydrogen generator 14 (Step S308). The raw material supplied to the reformer 14a flows as the combustion fuel through the fuel gas supply passage 71, a bypass passage (not shown in FIG. 10), and the off fuel gas passage 73 to be supplied to the combustor 14b. The bypass passage connects the fuel gas supply passage 71 and the off fuel gas passage 73.

The combustor 14b combusts the supplied combustion fuel (raw material) and combustion air to generate the flue gas and heat. The flue gas generated in the combustor 14b heats the reformer 14a and the like, and then, flows through the flue gas passage 80 and the discharge passage 70 to be discharged to the outside of the power generation system 100 (the building 200). Moreover, water is supplied from the water supply unit (not shown in FIG. 10) to the reformer 14a. When the reformer 14a is heated up to a predetermined temperature, the hydrogen-containing gas generated in the reformer 14a is supplied as the fuel gas to the fuel gas channel 11A of the fuel cell 11.

Whether or not the temperature of the reformer 14a has reached the predetermined temperature may be determined based on, for example, the temperature detected by a temperature detector provided so as to directly detect the temperature of the reformer 14a or a parameter (such as a time or a component of a gas supplied from the reformer 14a to the combustor 14b) capable of indirectly detecting the temperature of the reformer 14a.

Next, the controller 102 activates the oxidizing gas supply unit 15 (Step S309) to supply the oxidizing gas from the oxidizing gas supply unit 15 to the oxidizing gas channel 11B of the fuel cell 11. With this, in the fuel cell 11, the supplied fuel gas and oxidizing gas electrically react with each other to generate electricity and heat. The off fuel gas unconsumed in the fuel cell 11 flows as the combustion fuel through the off fuel gas passage 73 to be supplied to the combustor 14b. Moreover, the off oxidizing gas unconsumed in the fuel cell 11 flows through the discharge passage 70 to be discharged to the outside of the building 200.

Here, the exhaust gas flow rate control operation performed in a case where the combustion unit 103 is operating, the fuel cell unit 101 is in a stop state, and the controller 102 activates the fuel cell unit 101 will be more specifically explained in reference to FIG. 12B.

As shown in FIG. 12B, the combustion unit 103 is operating at a steady state, and the fuel cell unit 101 is in a stop state (Yes in Step S301 and No in Step S302 in FIG. 11). Then, the activation command of the fuel cell unit 101 is input to the controller 102 (Yes in Step S306 in FIG. 11).

Then, the controller 102 gradually increases the operation amount of the combustion fan 14c of the hydrogen generator 14 to activate the combustion fan 14c. By gradually increasing the operation amount of the combustion fan 14c, the pressure loss of the discharge passage 70 gradually increases. Therefore, the flow rate of the second exhaust gas (the flue gas) discharged from the combustor 17 to the discharge passage 70 gradually decreases. With this, the flow rate of the second exhaust gas (the combustion fuel or the combustion air) discharged from the combustion fuel supply unit or the combustion fan 18 to the discharge passage 70 just gradually decreases. Therefore, the deviation of the air-fuel ratio of the combustion in the combustion unit 103 (the combustor 17) can be suppressed to a small extent. On this account, in the power generation system 100 according to Embodiment 3, the combustion unit 103 can be stably operated.

The controller 102 may change the operation amount of the combustion fan 14c up to the target operation amount by using a longer time than a case where the combustion unit 103 is in a stop state and the controller 102 activates the combustion fan 14c (chain double-dashed line in FIG. 12B). With this, the rate of change of the flow rate of the first exhaust gas (herein, the combustion air) discharged from the combustion fan 14c to the discharge passage 70 can be made lower than that in a case where the combustion unit 103 is in a stop state and the controller 102 activates the combustion fan 14c.

Next, when the operation amount of the combustion fan 14c is changed up to the target operation amount, the controller 102 activates the raw material supply unit to supply the raw material to the reformer 14a (Step S308 in FIG. 11). When the raw material supplied to the reformer 14a is supplied to the combustor 14b, the combustor 14b combusts the supplied raw material (the combustion fuel) and the combustion air to generate the flue gas. The reformer 14a and the like are heated by heat transfer from the generated flue gas. The reformer 14a causes the reforming reaction between the separately supplied water (steam) and raw material to generate the hydrogen-containing gas. The generated hydrogen-containing gas is supplied to the fuel gas channel 11A of the fuel cell 11.

Next, when the reformer 14a is heated up to a predetermined temperature, the controller 102 activates the oxidizing gas supply unit 15 (Step S309 in FIG. 11) to supply the oxidizing gas to the oxidizing gas channel 11B of the fuel cell 11. Thus, the controller 102 starts the electric power generation of the fuel cell 11.

As above, in the power generation system 100 according to Embodiment 3, in a case where the exhaust gas is being discharged to the discharge passage 70 from one of the fuel cell unit 101 and the combustion unit 103 and the controller 102 changes the flow rate of the exhaust gas discharged from the other unit, the controller 102 controls the rate of change of the flow rate of the exhaust gas discharged from the other unit. Thus, the power generation system 100 can be stably operated.

In Embodiment 3, in Step S309 in FIG. 11, the controller 102 rapidly activates the oxidizing gas supply unit 15. However, the present embodiment is not limited to this. As with Embodiments 1 and 2, the controller 102 may gradually activate the oxidizing gas supply unit 15 (over time).

In Embodiment 3, in a case where the combustion unit 103 and the fuel cell unit 101 are operating and the controller 102 stops the fuel cell unit 101, the controller 102 controls the combustion fuel supply unit configured to supply the combustion fuel to the combustor 17 of the combustion unit 103 and the combustion fan 18 so as not to change the operation amount of each of the combustion fuel supply unit and the combustion fan 18. However, the present embodiment is not limited to this. As with Embodiment 2, the controller 102 may change the operation amount of each of the combustion fuel supply unit and the combustion fan 18 such that the operation amount of each of the combustion fuel supply unit and the combustion fan 18 follows the change in the operation amount of the oxidizing gas supply unit 15 or the combustion fan 14c.

Further, in Embodiment 3, in a case where the combustion unit 103 is operating and the fuel cell unit 101 is in a stop state and the controller 102 activates the fuel cell unit 101, the controller 102 controls the combustion fuel supply unit configured to supply the combustion fuel to the combustor 17 of the combustion unit 103 and the combustion fan 18 so as not to change the operation amount of each of the combustion fuel supply unit and the combustion fan 18. However, the present embodiment is not limited to this. As with Embodiment 2, the controller 102 may change the operation amount of each of the combustion fuel supply unit and the combustion fan 18 such that the operation amount of each of the combustion fuel supply unit and the combustion fan 18 follows the change in the operation amount of the oxidizing gas supply unit 15 or the combustion fan 14c.

In Embodiment 3, the fuel cell 11 and the hydrogen generator 14 are configured separately. However, the present embodiment is not limited to this. Like the solid-oxide fuel cell, the fuel cell 11 and the hydrogen generator 14 may be configured integrally. In this case, the fuel cell 11 and the hydrogen generator 14 are configured as one unit covered with a common heat insulating material, and the combustor 14b can heat not only the reformer 14a but also the fuel cell 11. In the direct internal reforming type solid-oxide fuel cell, since the anode of the fuel cell 11 has the function of the reformer 14a, the anode of the fuel cell 11 and the reformer 14a may be configured integrally. Further, since the configuration of the fuel cell 11 is similar to that of a typical fuel cell, a detailed explanation thereof is omitted.

Embodiment 4

In the power generation system according to Embodiment 4 of the present invention, the fuel cell unit includes a ventilation fan configured to ventilate the inside of the case.

Configuration of Power Generation System

Figure 13:
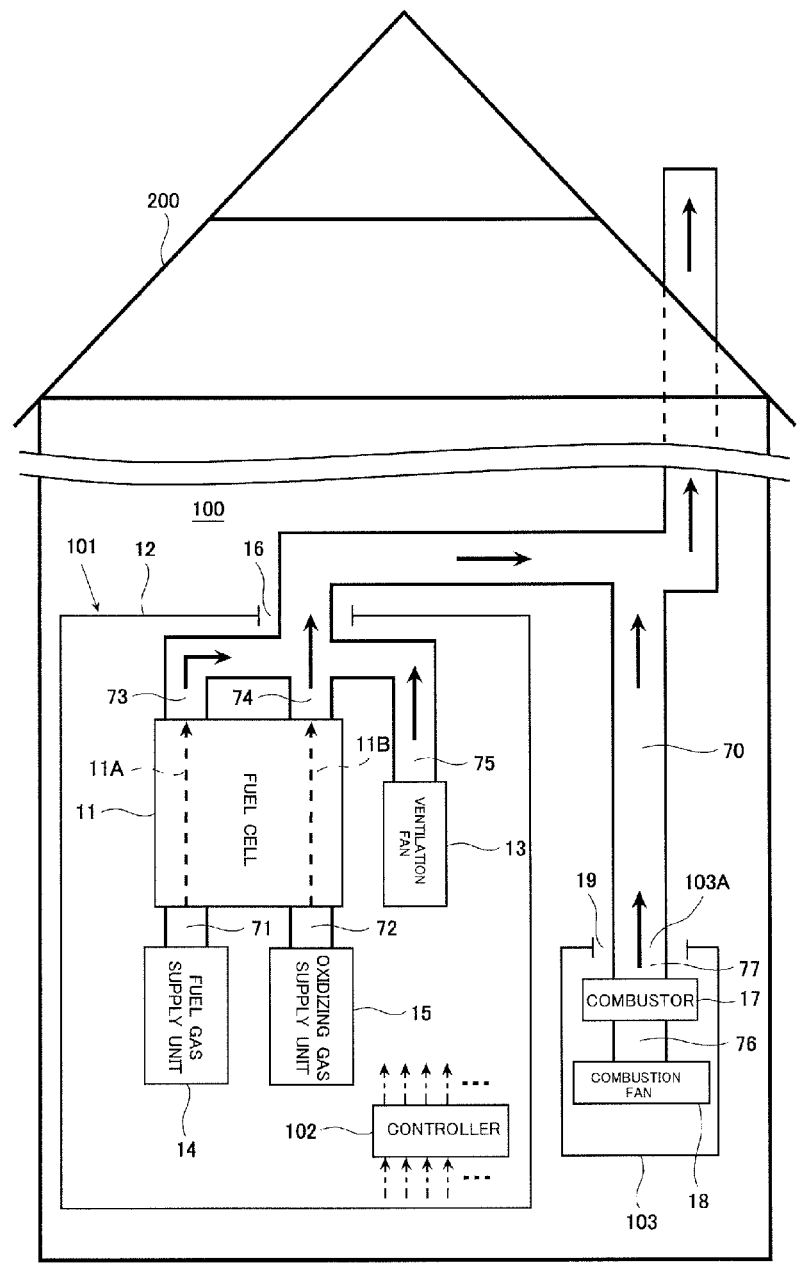
FIG. 13 is a schematic diagram showing the schematic configuration of the power generation system according to Embodiment 4 of the present invention.

FIG. 13 is a schematic diagram showing the schematic configuration of the power generation system according to Embodiment 4 of the present invention.

As shown in FIG. 13, the power generation system 100 according to Embodiment 4 of the present invention is the same in basic configuration as the power generation system 100 according to Embodiment 1 but is different from the power generation system 100 according to Embodiment 1 in that a ventilation fan 13 is provided in the case 12. Specifically, the ventilation fan 13 is connected to the discharge passage 70 through a ventilation passage 75. The ventilation fan 13 may have any configuration as long as it can ventilate the inside of the case 12.

With this, the air outside the power generation system 100 is supplied through the air supply port 16 to the inside of the case 12, and the gas (mainly, air) in the case 12 is discharged through the ventilation passage 75 and the discharge passage 70 to the outside of the building 200 by activating the ventilation fan 13. Thus, the inside of the case 12 is ventilated.

In Embodiment 4, the fan is used as a ventilator. However, the present embodiment is not limited to this. A blower may be used as the ventilator. Moreover, the ventilation fan 13 is provided in the case 12. However, the present embodiment is not limited to this. The ventilation fan 13 may be provided in the discharge passage 70. In this case, it is preferable that the ventilation fan 13 be provided upstream of a branch portion of the discharge passage 70.

Operations of Power Generation System

Next, the operations of the power generation system 100 according to Embodiment 4 will be explained in reference to FIGS. 13 to 15B. Specifically, operations performed in a case where the combustion unit 103 is operating and the controller 102 changes the flow rate of the exhaust gas discharged from the fuel cell unit 101 will be explained. Since operations performed in a case where the fuel cell unit 101 is operating and the controller 102 changes the flow rate of the exhaust gas discharged from the combustion unit 103 in the power generation system 100 according to Embodiment 4 are the same as those in the power generation system 100 according to Embodiments 1 and 2, detailed explanations thereof are omitted.

Figure 14:
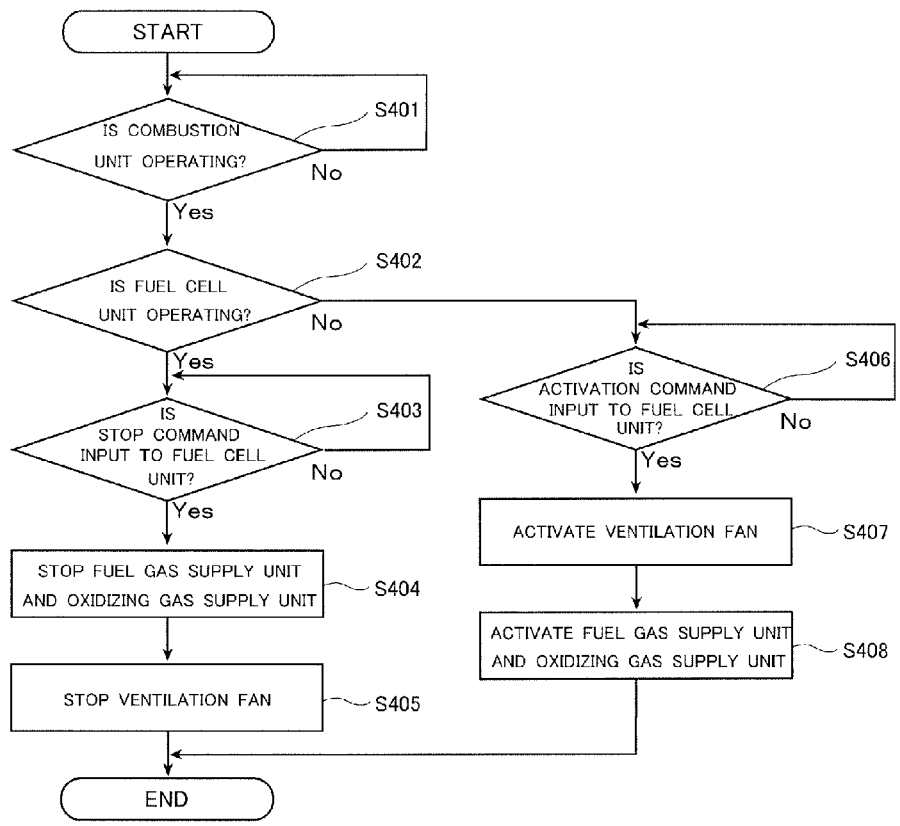
FIG. 14 is a flow chart schematically showing the exhaust gas flow rate control operation of the power generation system according to Embodiment 4.
Figure 15A:
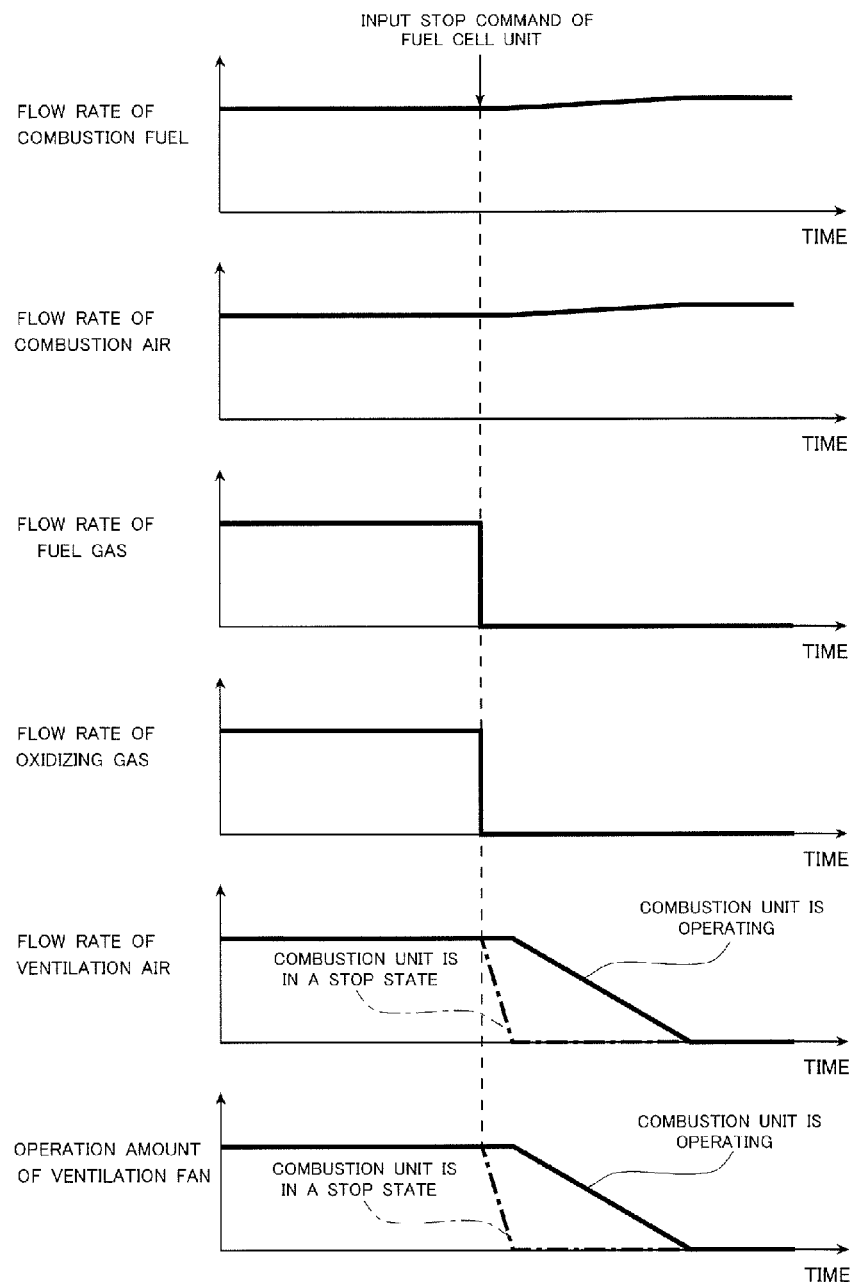
FIG. 15A is a time chart showing the operations of the major components constituting the power generation system in Steps S403 to S405 in the flow chart shown in FIG. 14.
Figure 15B:
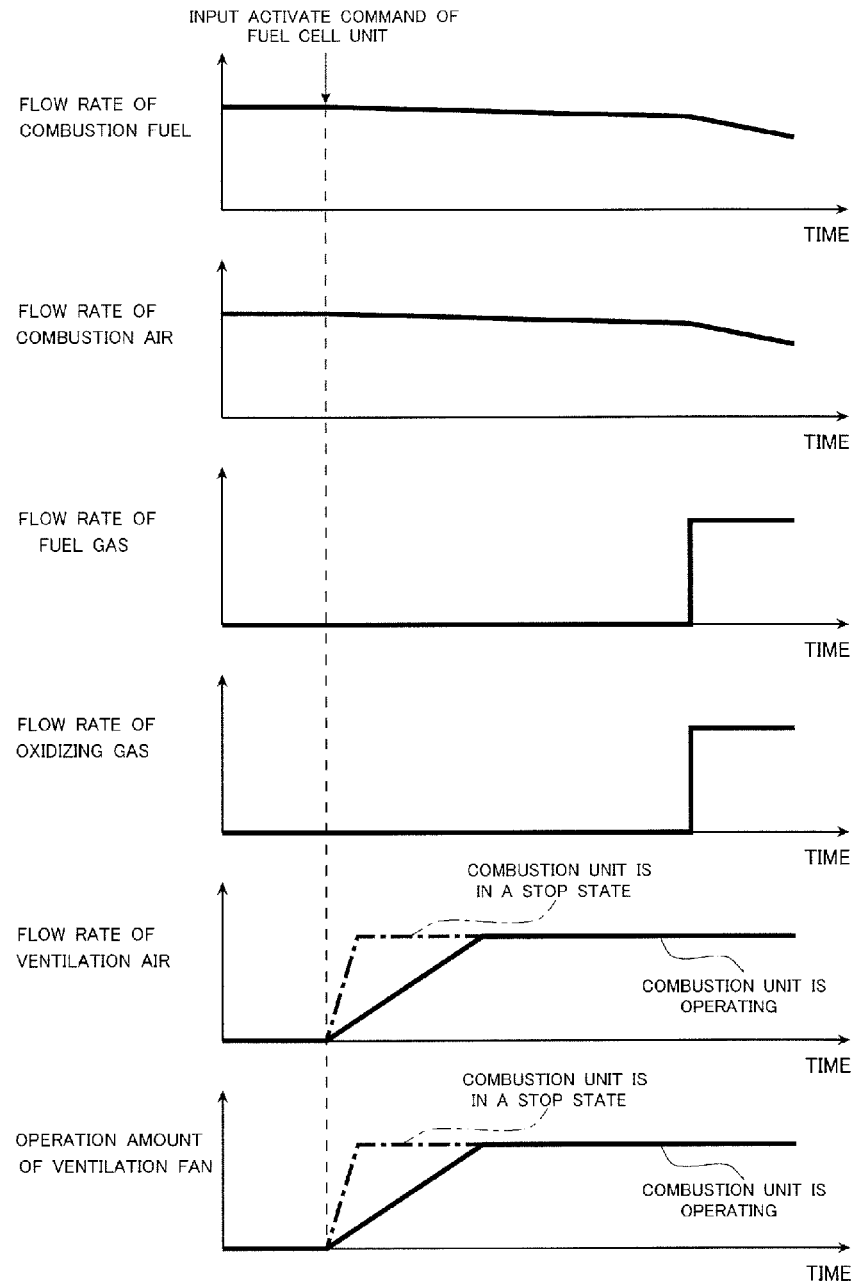
FIG. 15B is a time chart showing the operations of the major components constituting the power generation system in Steps S406 to S408 in the flow chart shown in FIG. 14.

FIG. 14 is a flow chart schematically showing the exhaust gas flow rate control operation of the power generation system according to Embodiment 4. FIG. 15A is a time chart showing the operations of the major components constituting the power generation system in Steps S403 to S405 in the flow chart shown in FIG. 14. FIG. 15B is a time chart showing the operations of the major components constituting the power generation system in Steps S406 to S408 in the flow chart shown in FIG. 14.

As shown in FIG. 14, the controller 102 confirms whether or not the combustion unit 103 is operating (Step S401). When the combustion unit 103 is not operating (No in Step S401), the controller 102 repeats Step S401 until the controller 102 confirms that the combustion unit 103 is operating. In contrast, when the combustion unit 103 is operating (Yes in Step S401), the controller 102 proceeds to Step S402.

In Step S402, the controller 102 determines whether or not the fuel cell unit 101 is operating. When the fuel cell unit 101 is in a stop state (No in Step S402), the controller 102 proceeds to Step S406. In contrast, when the fuel cell unit 101 is operating (Yes in Step S402), the controller 102 proceeds to Step S403.

In Step S403, the controller 102 confirms whether or not the stop command is input to the fuel cell unit 101. Examples of a case where the stop command of the fuel cell unit 101 is input is a case where the user of the power generation system 100 operates a remote controller, not shown, to instruct the stop of the fuel cell unit 101 and a case where the preset operation stop time of the fuel cell unit 101 has come.

When the stop command of the fuel cell unit 101 is not input (No in Step S403), the controller 102 repeats Step S403 until the stop command of the fuel cell unit 101 is input. In this case, the controller 102 may return to Step S401 and repeat Steps S401 to S403 until the controller 102 confirms that the combustion unit 103 and the fuel cell unit 101 are operating and the stop command of the fuel cell unit 101 is input. Moreover, in this case, the controller 102 may return to Step S402 and repeat Steps S402 and S403 until the controller 102 confirms that the fuel cell unit 101 is operating and the stop command of the fuel cell unit 101 is input.

In contrast, when the stop command of the fuel cell unit 101 is input (Yes in Step S403), the controller 102 proceeds to Step S404. In Step S404, the controller 102 stops the fuel gas supply unit 14 and the oxidizing gas supply unit 15 (see FIG. 15A). With this, the supply of the fuel gas from the fuel gas supply unit 14 to the fuel gas channel 11A of the fuel cell 11 stops, and the supply of the oxidizing gas from the oxidizing gas supply unit 15 to the oxidizing gas channel 11B of the fuel cell 11 stops. Thus, the electric power generation of the fuel cell 11 stops.

Next, the controller 102 stops the ventilation fan 13 (Step S405). At this time, the controller 102 controls the ventilation fan 13 such that the flow rate of the second exhaust gas (herein, the flue gas) discharged from the combustion unit 103 becomes constant. That is, the controller 102 controls the rate of change of the flow rate of the first exhaust gas (herein, the gas in the case 12 (hereinafter referred to as "ventilation air")) discharged from the fuel cell unit 101 (herein, the ventilation fan 13).

For example, the controller 102 may control the ventilation fan 13 such that the rate of change of the flow rate of the ventilation air discharged from the ventilation fan 13 through the ventilation passage 75 to the discharge passage 70 becomes lower than that in a case where the combustion unit 103 is in a stop state and the controller 102 stops the fuel cell unit 101 (to be precise, the ventilation fan 13). Moreover, for example, the controller 102 may control the ventilation fan 13 such that the amount of time in which the controller 102 changes the operation amount of the ventilation fan 13 becomes larger than that in a case where the combustion unit 103 is in a stop state and the controller 102 stops the fuel cell unit 101 (to be precise, the ventilation fan 13).

Here, the exhaust gas flow rate control operation performed in a case where the combustion unit 103 and the fuel cell unit 101 are operating and the controller 102 stops the fuel cell unit 101 will be more specifically explained in reference to FIG. 15A.

As shown in FIG. 15A, each of the combustion unit 103 and the fuel cell unit 101 is operating at a steady state (Yes in each of Steps S401 and S402 in FIG. 14). When the stop command of the fuel cell unit 101 is input to the controller 102 (Yes in Step S403 in FIG. 14), the controller 102 stops the fuel gas supply unit 14 and the oxidizing gas supply unit 15 (Step S404 in FIG. 14).

Next, the controller 102 gradually decreases the operation amount of the ventilation fan 13 to stop the ventilation fan 13 (Step S405 in FIG. 14). By gradually decreasing the operation amount of the ventilation fan 13, the pressure loss of the discharge passage 70 gradually decreases. Therefore, the flow rate of the second exhaust gas (the flue gas) discharged from the combustion unit 103 to the discharge passage 70 gradually increases. With this, the flow rate of the combustion fuel supplied from the combustion fuel supply unit (not shown) to the combustor 17 and the flow rate of the combustion air supplied from the combustion fan 18 to the combustor 17 just gradually increase. Therefore, the deviation of the air-fuel ratio of the combustion in the combustion unit 103 (the combustor 17) can be suppressed to a small extent. On this account, in the power generation system 100 according to Embodiment 4, the combustion unit 103 can be stably operated.

For example, the controller 102 may stop the ventilation fan 13 such that the amount of time in which the controller 102 changes the operation amount of the ventilation fan 13 becomes larger than that in a case where the combustion unit 103 is in a stop state and the controller 102 stops the ventilation fan 13 (chain double-dashed line in FIG. 15A). With this, the rate of change of the flow rate of the first exhaust gas (the ventilation air) discharged from the ventilation fan 13 to the discharge passage 70 can be made smaller than that in a case where the combustion unit 103 is in a stop state and the controller 102 stops the ventilation fan 13.

In Embodiment 4, the controller 102 rapidly stops the oxidizing gas supply unit 15 in Step S404 in FIG. 14. However, the present embodiment is not limited to this. As with Embodiment 1 or 2, the controller 102 may gradually stop the oxidizing gas supply unit 15 (over time), and then, gradually stop the ventilation fan 13.

In Embodiment 4, the fuel gas supply unit 14 is constituted by a hydrogen bomb or the like. However, the fuel gas supply unit 14 may be constituted by the hydrogen generator explained in Embodiment 3. In this case, it is preferable that in Step S404, as with Embodiment 3, the controller 102 stop the combustion fan 14c and the oxidizing gas supply unit 15 so as to gradually decrease the operation amount of each of the combustion fan 14c and the oxidizing gas supply unit 15, and then, in Step S405, the controller 102 gradually decrease the operation amount of the ventilation fan 13 to stop the ventilation fan 13.

Further, in Embodiment 4, when stopping the ventilation fan 13 in Step S405, the controller 102 controls the combustion fuel supply unit configured to supply the combustion fuel to the combustor 17 of the combustion unit 103 and the combustion fan 18 such that the operation amount of each of the combustion fuel supply unit and the combustion fan 18 does not change. However, the present embodiment is not limited to this. As with Embodiment 2, the controller 102 may change the operation amount of each of the combustion fuel supply unit and the combustion fan 18 such that the operation amount of each of the combustion fuel supply unit and the combustion fan 18 follows the change in the operation amount of the ventilation fan 13. Moreover, as described above, in a case where the hydrogen generator explained in Embodiment 3 is used as the fuel gas supply unit 14, the controller 102 may change the operation amount of each of the combustion fuel supply unit and the combustion fan 18 such that the operation amount of each of the combustion fuel supply unit and the combustion fan 18 follows the change in the operation amount of the combustion fan 14c or the oxidizing gas supply unit 15.

In contrast, in FIG. 14, when the fuel cell unit 101 is in a stop state (No in Step S402), the controller 102 proceeds to Step S406. In Step S406, the controller 102 confirms whether or not the activation command of the fuel cell unit 101 is input. Examples of a case where the activation command of the fuel cell unit 101 is input are a case where the user of the power generation system 100 operates a remote controller, not shown, to instruct the activation of the fuel cell unit 101 and a case where the preset operation start time of the fuel cell unit 101 has come.

When the activation command of the fuel cell unit 101 is not input (No in Step S406), the controller 102 repeats Step S406 until the activation command of the fuel cell unit 101 is input. In this case, the controller 102 may return to Step S401 and repeat Steps S401, S402, and S406 until the controller 102 confirms that the combustion unit 103 is operating, the fuel cell unit 101 is in a stop state, and the activation command of the fuel cell unit 101 is input.

In contrast, when the activation command of the fuel cell unit 101 is input (Yes in Step S406), the controller 102 proceeds to Step S407. In Step S407, the controller 102 activates the ventilation fan 13.

At this time, the controller 102 controls the ventilation fan 13 such that the flow rate of the second exhaust gas (the flue gas (the combustion fuel and the combustion air)) discharged from the combustion unit 103 (the combustion fuel supply unit and the combustion fan 18) becomes constant. That is, the controller 102 controls the rate of change of the flow rate of the first exhaust gas (herein, the ventilation air) discharged from the fuel cell unit 101 (herein, the ventilation fan 13).

For example, the controller 102 may control the ventilation fan 13 such that the rate of change of the flow rate of the ventilation air discharged from the ventilation fan 13 to the discharge passage 70 becomes lower than that in a case where the combustion unit 103 is in a stop state and the controller 102 activates the fuel cell unit 101 (to be precise, the ventilation fan 13). Moreover, for example, the controller 102 may control the ventilation fan 13 such that the amount of time in which the controller 102 changes the operation amount of the ventilation fan 13 becomes larger than that in a case where the combustion unit 103 is in a stop state and the controller 102 activates the fuel cell unit 101 (to be precise, the ventilation fan 13).

Next, the controller 102 activates the fuel gas supply unit 14 and the oxidizing gas supply unit 15 (Step S408). With this, the fuel gas is supplied from the fuel gas supply unit 14 to the fuel gas channel 11A of the fuel cell 11, and the oxidizing gas is supplied from the oxidizing gas supply unit 15 to the oxidizing gas channel 11B of the fuel cell 11. Then, in the fuel cell 11, the supplied fuel gas and oxidizing gas electrically react with each other to generate electricity and heat.

Here, the exhaust gas flow rate control operation performed in a case where the combustion unit 103 is operating, the fuel cell unit 101 is in a stop state, and the controller 102 activates the fuel cell unit 101 will be more specifically explained in reference to FIG. 15B.

As shown in FIG. 15B, the combustion unit 103 is operating at a steady state, and the fuel cell unit 101 is in a stop state (Yes in Step S401 and No in Step S402 in FIG. 14). Then, the activation command of the fuel cell unit 101 is input to the controller 102 (Yes in Step S406 in FIG. 14).

Then, the controller 102 gradually increases the operation amount of the ventilation fan 13 to activate the ventilation fan 13. By gradually increasing the operation amount of the ventilation fan 13, the pressure loss of the discharge passage 70 gradually increases. Therefore, the flow rate of the second exhaust gas (the flue gas) discharged from the combustor 17 to the discharge passage 70 gradually decreases. With this, the flow rate of the second exhaust gas (the combustion fuel or the combustion air) discharged from the combustion fuel supply unit or the combustion fan 18 to the discharge passage 70 just gradually decreases. Therefore, the deviation of the air-fuel ratio of the combustion in the combustion unit 103 (the combustor 17) can be suppressed to a small extent. On this account, in the power generation system 100 according to Embodiment 4, the combustion unit 103 can be stably operated.

The controller 102 changes the operation amount of the ventilation fan 13 up to the target operation amount by using a longer time than a case where the combustion unit 103 is in a stop state and the controller 102 activates the ventilation fan 13 (chain double-dashed line in FIG. 15B). With this, the rate of change of the flow rate of the first exhaust gas (herein, the ventilation air) discharged from the ventilation fan 13 to the discharge passage 70 can be made lower than that in a case where the combustion unit 103 is in a stop state and the controller 102 activates the ventilation fan 13.

Next, when the operation amount of the ventilation fan 13 is changed up to the target operation amount, the controller 102 activates the fuel gas supply unit 14 and the oxidizing gas supply unit 15 (Step S408 in FIG. 14). With this, the fuel gas is supplied from the fuel gas supply unit 14 to the fuel gas channel 11A of the fuel cell 11, and the oxidizing gas is supplied from the oxidizing gas supply unit 15 to the oxidizing gas channel 11B of the fuel cell 11. Thus, the controller 102 starts the electric power generation of the fuel cell 11.

In Embodiment 4, in Step S408 in FIG. 14, the controller 102 rapidly activates the oxidizing gas supply unit 15. However, the present embodiment is not limited to this. As with Embodiment 1 or 2, the controller 102 may gradually activate the oxidizing gas supply unit 15 (over time).

In Embodiment 4, the fuel gas supply unit 14 is constituted by a hydrogen bomb or the like. However, the fuel gas supply unit 14 may be constituted by the hydrogen generator explained in Embodiment 3. In this case, it is preferable that in Step S408, as with Embodiment 3, the controller 102 activate the combustion fan 14c and the oxidizing gas supply unit 15 so as to gradually increase the operation amount of each of the combustion fan 14c and the oxidizing gas supply unit 15.

Further, in Embodiment 4, when the controller 102 activates the ventilation fan 13 in Step S407, the controller 102 controls the combustion fuel supply unit configured to supply the combustion fuel to the combustor 17 of the combustion unit 103 and the combustion fan 18 so as not to change the operation amount of each of the combustion fuel supply unit and the combustion fan 18. However, the present embodiment is not limited to this. As with Embodiment 2, the controller 102 may change the operation amount of each of the combustion fuel supply unit and the combustion fan 18 such that the operation amount of each of the combustion fuel supply unit and the combustion fan 18 follows the change in the operation amount of the ventilation fan 13. Moreover, as described above, in a case where the hydrogen generator explained in Embodiment 3 is used as the fuel gas supply unit 14, the controller 102 may change the operation amount of each of the combustion fuel supply unit and the combustion fan 18 in Step S408 such that the operation amount of each of the combustion fuel supply unit and the combustion fan 18 follows the change in the operation amount of the combustion fan 14c or the oxidizing gas supply unit 15.

The power generation system 100 according to Embodiment 4 configured as above also has the same operational advantages as the power generation system 100 according to Embodiment 1.

Embodiment 5

The power generation system according to Embodiment 5 of the present invention further includes an air intake passage configured to have one end that is open to an atmosphere, branch such that the other ends thereof are respectively connected to the fuel cell unit and the combustion unit, and supply air therethrough to the fuel cell unit and the combustion unit, wherein the air intake passage is provided so as to be heat-exchangeable with the discharge passage.

Here, the expression "the air intake passage is provided so as to be heat-exchangeable with the discharge passage" does not denote that the air intake passage and the discharge passage have to contact each other and denotes that the air intake passage and the discharge passage may be spaced apart from each other such that the gas in the air intake passage and the gas in the exhaust passage is heat-exchangeable with each other. Therefore, the air intake passage and the discharge passage may be provided with a space therebetween. Moreover, in one of these passages, the other passage may be provided. To be specific, a pipe constituting the air intake passage and a pipe constituting the exhaust passage may be provided to form a double pipe.

Configuration of Power Generation System

Figure 16:
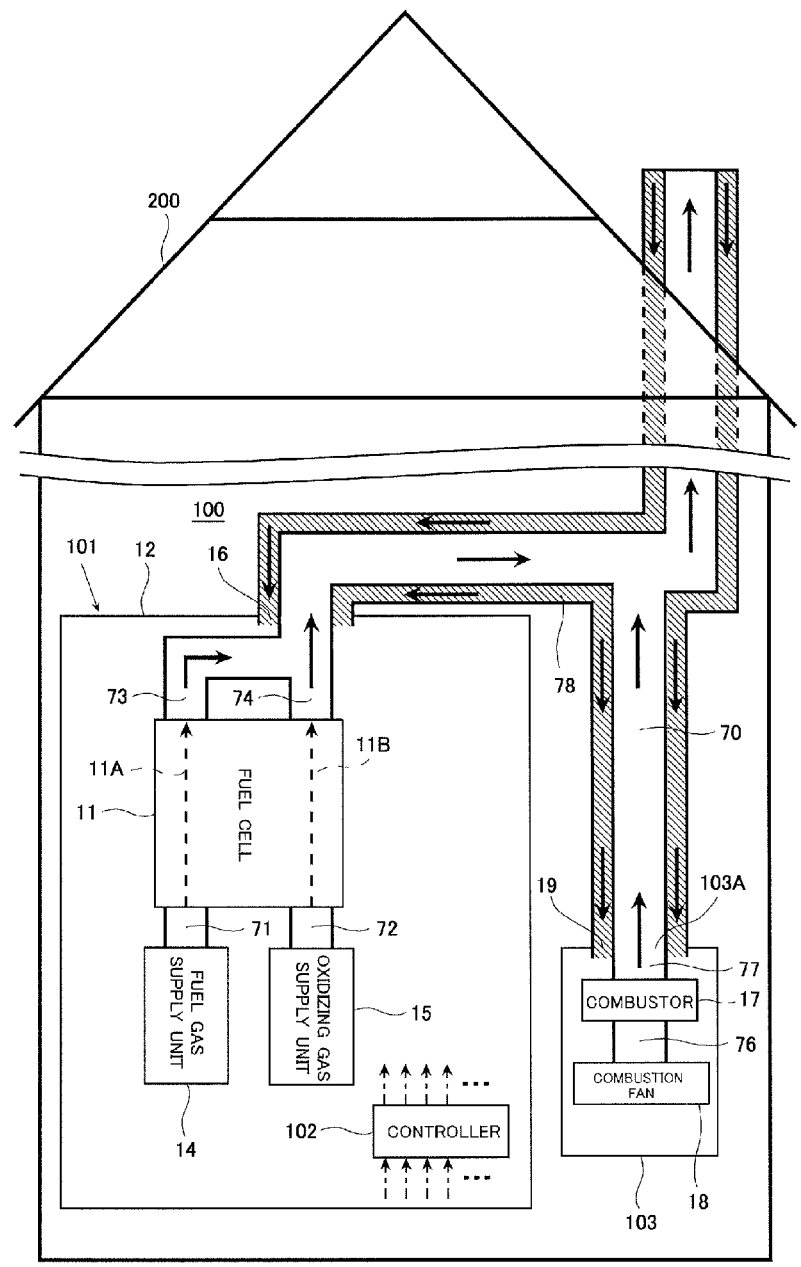
FIG. 16 is a schematic diagram showing the schematic configuration of the power generation system according to Embodiment 5.

FIG. 16 is a schematic diagram showing the schematic configuration of the power generation system according to Embodiment 5. In FIG. 16, the air intake passage is shown by hatching.

As shown in FIG. 16, the power generation system 100 according to Embodiment 5 is the same in basic configuration as the power generation system 100 according to Embodiment 1 but is different from the power generation system 100 according to Embodiment 1 in that an air intake passage 78 is provided.

Specifically, the air intake passage 78 causes the combustion unit 103 and the case 12 of the fuel cell unit 101 to communicate with each other. Moreover, the air is supplied from the outside (herein, the outside of the building 200) through the air intake passage 78 to the combustion unit 103 and the fuel cell unit 101. Further, the air intake passage 78 is formed to surround an outer periphery of the discharge passage 70. More specifically, the air intake passage 78 branches, and two downstream ends thereof are respectively connected to the hole 16 and the hole 19. The air intake passage 78 is formed so as to extend up to the outside of the building 200, and an upstream end (opening) thereof is open to the atmosphere. With this, the air intake passage 78 can cause the case 12 and the combustion unit 103 to communicate with each other, and the air can be supplied from the outside of the power generation system 100 through the air intake passage 78 to the fuel cell unit 101 and the combustion unit 103.

The air intake passage 78 and the discharge passage 70 are constituted by a so-called double pipe. With this, when the flue gas (the exhaust gas) is discharged from the combustion unit 103 to the discharge passage 70, the gas in the air intake passage 78 is heated by the heat transfer from the flue gas.

The power generation system 100 according to Embodiment 5 configured as above also has the same operational advantages as the power generation system 100 according to Embodiment 1.

In Embodiments 1 to 5, the controller 102 controls the combustion fan 14c, the oxidizing gas supply unit 15, or the like so as to linearly change the operation amount of the combustion fan 14c, the oxidizing gas supply unit 15, or the like (see FIG. 3A, for example). However, the present embodiment is not limited to this. For example, the operation amount of the combustion fan 14c or the like may be changed as shown in FIG. 17. Here, FIG. 17 is a time chart showing the operations of the fuel cell unit (or the combustion unit).

Figure 17A:
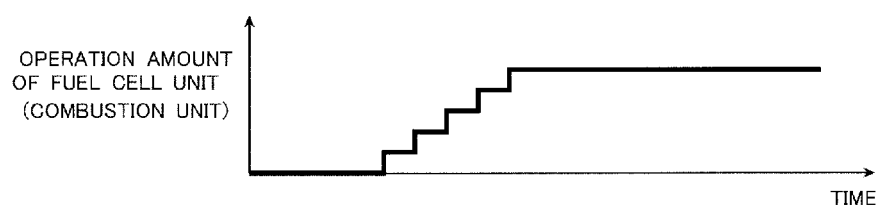
FIG. 17 is a time chart showing the operations of a fuel cell unit (or a combustion unit).
Figure 17B:
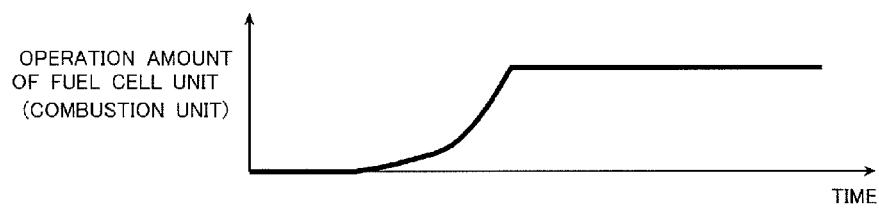

As shown in FIG. 17A, the controller 102 may control the fuel cell unit 101 (or the combustion unit 103) so as to stepwisely change the operation amount of the fuel cell unit 101 (or the combustion unit 103). Moreover, as shown in FIG. 17B, the controller 102 may control the fuel cell unit 101 (or the combustion unit 103) or the like such that the rate of change of the operation amount of the fuel cell unit 101 (or the combustion unit 103) is low for a predetermined time from the start of the change in the operation amount of the fuel cell unit 101 (or the combustion unit 103) and then the rate of change of the operation amount thereof is increased.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

According to the power generation system of the present invention and the method of operating the power generation system, even if the operation state of one of the fuel cell unit and the combustion unit changes, the other unit that is operating can be stably operated. Therefore, the power generation system of the present invention and the method of operating the power generation system are useful in the field of fuel cells.

REFERENCE SIGNS LIST 11 fuel cell
11A fuel gas channel
11B oxidizing gas channel
12 case
13 ventilation fan
14 fuel gas supply unit
14a reformer
14b combustor
14c combustion fan
15 oxidizing gas supply unit
16 air supply port
17 combustor
18 combustion fan
19 air supply port
70 discharge passage
71 fuel gas supply passage
72 oxidizing gas supply passage
73 off fuel gas passage
74 off oxidizing gas passage
75 ventilation passage
76 combustion air supply passage
77 exhaust gas passage
78 air intake passage
79 air supply passage
80 flue gas passage
100 power generation system
101 fuel cell unit
102 controller
103 combustion unit
103A exhaust port
200 building

The invention claimed is:

1. A power generation system comprising:
a fuel cell unit including:
a fuel cell configured to generate electric power using a hydrogen-containing fuel gas and an oxidizing gas and a case configured to house the fuel cell; and
a hydrogen generator including a reformer configured to generate the hydrogen-containing fuel gas from a raw material and water and a combustor configured to heat the reformer;
a combustion unit provided outside the case and configured to combust a combustible gas to supply heat;
a discharge passage configured to cause the fuel cell unit and the combustion unit to communicate with each other and provided to discharge a first exhaust gas from the fuel cell unit and a second exhaust gas from the combustion unit to an atmosphere; and
a controller including a processing portion and a memory storing a program, wherein:
the first exhaust gas contains a flue gas discharged from the combustor, and
the program, when executed by the processing portion, causes the controller to perform,
in a case where the first exhaust gas is being discharged to the discharge passage from the fuel cell unit and the second exhaust gas is being discharged to the discharge passage from the combustion unit when the fuel cell unit and the combustion unit are operating, and the controller changes a flow rate of the second exhaust gas discharged from the combustion unit,
restricting a rate of change of the flow rate of the second exhaust gas discharged from the combustion unit and simultaneously controlling the flow rate of the first exhaust gas from the fuel cell such that a flow rate of the first exhaust gas discharged from the fuel cell unit becomes constant.

2. The power generation system according to claim 1, wherein in a case where the first exhaust gas is being discharged from the fuel cell unit to the discharge passage and the controller changes the flow rate of the second exhaust gas discharged from the combustion unit, the program, when executed, further causes the controller to control the fuel cell unit and the combustion unit such that the amount of time in which the controller changes an operation amount of the combustion unit becomes equal to or larger than the amount of time in which the controller changes an operation amount of the fuel cell unit.

3. The power generation system according to claim 1, wherein in a case where the first exhaust gas is being discharged from the fuel cell unit to the discharge passage and the controller changes the flow rate of the second exhaust gas discharged from the combustion unit, the program, when executed, further causes the controller to control the combustion unit such that a rate of change of the operation amount of the combustion unit becomes lower than that in a case where the fuel cell unit is in a stop state and the controller changes the flow rate of the second exhaust gas discharged from the combustion unit.

4. The power generation system according to claim 1, wherein in a case where the first exhaust gas is being discharged from the fuel cell unit to the discharge passage and the controller changes the flow rate of the second exhaust gas discharged from the combustion unit, the program, when executed, further causes the controller to control the combustion unit such that the amount of time in which the controller changes the operation amount of the combustion unit becomes larger than that in a case where the fuel cell unit is in a stop state and the controller changes the flow rate of the second exhaust gas discharged from the combustion unit.

5. The power generation system according to claim 1, further comprising an air intake passage configured to have one end that is open to an atmosphere, branch such that the other ends thereof are respectively connected to the fuel cell unit and the combustion unit, and supply air therethrough to the fuel cell unit and the combustion unit, wherein
the air intake passage is provided so as to be heat-exchangeable with the discharge passage.

6. A method of operating a power generation system,
the power generation system comprising:
a fuel cell unit including:
a fuel cell configured to generate electric power using a hydrogen-containing fuel gas and an oxidizing gas and a case configured to house the fuel cell; and
a hydrogen generator including a reformer configured to generate the hydrogen-containing fuel gas from a raw material and water and a combustor configured to heat the reformer;
a combustion unit provided outside the case and configured to combust a combustible gas to supply heat;
a discharge passage configured to cause the fuel cell unit and the combustion unit to communicate with each other and provided to discharge a first exhaust gas from the fuel cell unit and a second exhaust gas from the combustion unit to an atmosphere; and
a controller including a processing portion and a memory storing a program, wherein:
the first exhaust gas contains a flue gas discharged from the combustor, and
the method comprises, in a case where the first exhaust gas is being discharged to the discharge passage from the fuel cell unit and the second exhaust gas is being discharged to the discharge passage from the combustion unit when the fuel cell unit and the combustion unit are operating, and the controller changes a flow rate of the second exhaust gas discharged from the combustion unit, restricting by the controller a rate of change of the flow rate of the second exhaust gas discharged from the combustion unit and simultaneously controlling the flow rate of the first exhaust gas from the fuel cell such that a flow rate of the first exhaust gas discharged from the fuel cell unit becomes constant.

* * * * *